US011798099B2

United States Patent
Seth et al.

(10) Patent No.: US 11,798,099 B2
(45) Date of Patent: *Oct. 24, 2023

(54) SYSTEMS AND METHODS FOR AUTOMATED ACCIDENT ANALYSIS

(71) Applicant: The Travelers Indemnity Company, Hartford, CT (US)

(72) Inventors: Rohit Seth, Oakville (CA); Shahbaz R. Bhatti, Mississauga (CA); Chandan M. Roy, North York (CA); Alan M. O'Brien, Ajax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,832

(22) Filed: Nov. 22, 2022

(65) Prior Publication Data

US 2023/0136253 A1    May 4, 2023

Related U.S. Application Data

(63) Continuation of application No. 15/892,363, filed on Feb. 8, 2018, now Pat. No. 11,562,436.

(51) Int. Cl.
*G06Q 40/08*     (2012.01)
*G06F 16/73*     (2019.01)

(52) U.S. Cl.
CPC ........... *G06Q 40/08* (2013.01); *G06F 16/73* (2019.01)

(58) Field of Classification Search
CPC ............................... G06Q 40/08; G06F 16/73
USPC ........................................................... 705/4
See application file for complete search history.

(56) References Cited

U.S. PATENT DOCUMENTS

| | | | | |
|---|---|---|---|---|
| 9,728,087 B2* | 8/2017 | Davis | | G08B 25/016 |
| 9,734,537 B2* | 8/2017 | Christensen | | G06Q 30/0208 |
| 9,763,271 B1* | 9/2017 | Gabel | | G06Q 30/08 |
| 9,767,625 B1* | 9/2017 | Snyder | | G07C 5/008 |
| 9,773,281 B1* | 9/2017 | Hanson | | H04W 4/023 |
| 9,886,841 B1* | 2/2018 | Nave | | G05D 1/0088 |
| 9,959,764 B1* | 5/2018 | Binion | | B60R 21/00 |
| 10,121,204 B1 | 11/2018 | Brandmaier et al. | | |
| 10,163,327 B1 | 12/2018 | Potter et al. | | |
| 10,176,524 B1* | 1/2019 | Brandmaier | | G08G 1/0112 |
| 10,217,168 B2 | 2/2019 | Tofte et al. | | |
| 10,231,110 B1 | 3/2019 | Call et al. | | |
| 10,282,922 B1 | 5/2019 | Nejah et al. | | |
| 10,347,111 B1 | 7/2019 | Hollenstain et al. | | |

(Continued)

FOREIGN PATENT DOCUMENTS

| | | | | |
|---|---|---|---|---|
| CN | 105956265 | | 9/2016 | |
| CN | 105956265 A | * | 9/2016 | ......... G06F 17/5009 |

(Continued)

OTHER PUBLICATIONS

Title: Automated Accident Detection and Rescue System Authors: Venkata Krishna Kota, et al. IEEE Xplore Date: 2017 (Year: 2017).*
Office Action for U.S. Appl. No. 15/892,363 dated Sep. 25, 2019; 25 pps.
Final Office Action for U.S. Appl. No. 15/892,363 dated Apr. 20, 2020; 28 pps.

(Continued)

*Primary Examiner* — Christopher Bridges
*Assistant Examiner* — Yongsik Park
(74) *Attorney, Agent, or Firm* — RowanTree Law Group, PLLC; Carson C. K. Fincham

(57) ABSTRACT

Systems and methods for automated accident analysis such as automatic multi-device accident detection and verification, automated multi-device information capture, and automated geospatial and geo-relational digital scene recreation.

36 Claims, 11 Drawing Sheets

(56) References Cited

U.S. PATENT DOCUMENTS

| | | | |
|---|---|---|---|
| 10,387,960 B2 | 8/2019 | Tofte et al. | |
| 10,387,962 B1 * | 8/2019 | Potter | G08B 21/02 |
| 10,430,885 B1 | 10/2019 | Brandmaier et al. | |
| 10,430,886 B1 | 10/2019 | Brandmaier et al. | |
| 10,504,302 B1 | 12/2019 | Chavez et al. | |
| 10,600,123 B1 | 3/2020 | Medina, III et al. | |
| 11,157,973 B2 * | 10/2021 | Fuchs | G06Q 30/0283 |
| 2007/0106437 A1 * | 5/2007 | Kim | G06Q 10/06 701/31.4 |
| 2013/0317864 A1 * | 11/2013 | Tofte | G06Q 10/06 705/4 |
| 2014/0129080 A1 * | 5/2014 | Leibowitz | B60R 16/0231 705/26.7 |
| 2017/0221283 A1 * | 8/2017 | Pal | G06Q 40/08 |

FOREIGN PATENT DOCUMENTS

| | | | |
|---|---|---|---|
| JP | 2018085646 | | 5/2018 |
| JP | 2018085646 A | * | 5/2018 |

OTHER PUBLICATIONS

Office Action for U.S. Appl. No. 15/892,363 dated Aug. 17, 2020; 32 pps.
Notice of Allowance for U.S. Appl. No. 15/892,363 dated Sep. 8, 2022; 9 pps.
Venkata Krishna Kota et al. "Automated Accidence Detection and Rescue System" IEEE Xplore 2017.

* cited by examiner

SYSTEMS AND METHODS FOR AUTOMATED ACCIDENT ANALYSIS

CROSS-REFERENCE TO RELATED APPLICATIONS

Benefit and priority under 35 U.S.C. § 120 is hereby claimed to, and this is a Continuation of, U.S. patent application Ser. No. 15/892,363 filed on Feb. 8, 2018 and titled "SYSTEMS AND METHODS FOR AUTOMATED ACCIDENT ANALYSIS", which issued as U.S. Pat. No. 11,562,436 on Jan. 24, 2023, the contents of which are hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Car accidents in the United States average around six million (6 million) per year[1] and result in approximately twenty-seven and a half billion dollars ($27.5 billion) in claimed insurance collision losses alone, annually[2]. With so much liability and insurance exposure at stake, processes for detecting and managing accidents, as well as for reporting and analyzing insurance claims resulting therefrom can be extremely advantageous. Existing on-board crash detection systems assist in expediting the summoning of emergency services to an accident scene, for example, and applications that allow insurance customers to submit digital photos of damage to an insurance company facilitate expedited claims processing.

[1] For 2015, estimated at six million two hundred and ninety-six thousand (6,296,000) police-reported traffic crashes by the National Highway Transportation and Safety Administration (NHTSA), U.S. Department of Transportation: https://crashstats.nhtsa.dot.gov/Api/Public/ViewPublication/812376.
[2] The Auto Insurance Database Report (2012/2013) published by the National Association of Insurance Commissioners, at pg. 176: http:/www.naic.org/documents/prod_serv_statistical_aut_pb.pdf.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1:
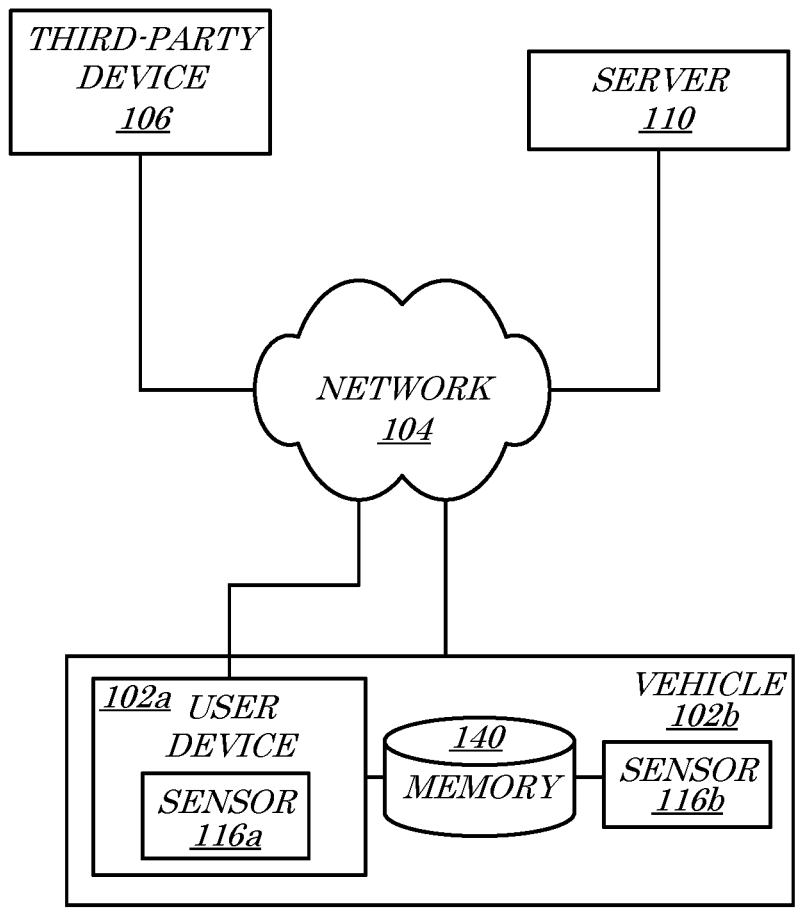
FIG. 1 is a block diagram of a system according to some embodiments.

Due to the high volume and great costs arising from automobile (and other vehicle or object, e.g., home and/or business) accidents every year, the number of insurance claims that require processing is a critical factor for insurance companies to manage. With the current average lag time between an accident occurrence and insurance claim initiation being approximately eight (8) hours, claim handling queues have been lengthened and important accident details may have been lost, forgotten, or overlooked by the time a claim is initiated. Any reduction in the lag time may accordingly be beneficial for reducing processing queues and/or reducing the likelihood of important details descriptive of the accident being lost. Preservation of accident details or evidence may also or alternatively benefit accident reconstruction and/or fault analysis procedures and/or legal investigations.

Previous claim process facilitation systems allow accident victims to submit digital photos of sustained damage, but do not otherwise address reduction of claim processing lag times (particularly in the initial lag time of claim reporting). Accident-detection systems are primarily directed to mitigating injury and loss of life by expediting emergency services deployment, but offer little or no post-emergency functionality.

In accordance with embodiments herein, these and other deficiencies of previous efforts are remedied by providing systems, apparatus, methods, and articles of manufacture for automated accident analysis. In some embodiments, for example, an accident analysis system may employ a set of logical rules and/or procedures that are specially-coded to (i) detect and/or verify accident occurrences (e.g., auto, home, and/or business), (ii) automatically capture accident event evidence, (iii) provide structured prompts that guide an accident victim through post-emergency tasks and/or checklists, and/or (iv) automatically analyze accident evidence to derive at least one accident result (e.g., an assignment of fault, blame, or liability and/or a determination regarding an insurance claim payment and/or payment amount). According to some embodiments, an automatic accident analysis system may capture data from a variety of sensors disposed to collect data descriptive of the accident and/or accident scene. In some embodiments for example, the system may automatically capture and/or analyze video, audio, and/or image data captured by a camera array of one or more vehicles involved in an accident (or of a home or business security system, in the case of a non-vehicle accident/event). Many automobiles are now outfitted with, for example, what are described as "360°" or "birds-eye view" camera arrays that provide video and/or images of the area surrounding a vehicle. According to some embodiments, the system may automatically acquire video and/or image feed data from such an array and utilize the data to construct a virtual representation of the accident scene and/or to analyze the accident event (e.g., to derive an accident result).

As utilized herein, the term "accident result" may generally refer to any conclusion and/or determination that is defined and/or derived based on an analysis of accident data and/or evidence. With respect to legal liability (criminal and/or civil), fault, and/or blame, for example, an accident result may comprise an estimate and/or calculation of assigned responsibility (e.g., causation) for the accident event. In the case of an insurance claim for the accident event, an accident result may comprise a determination and/or decision regarding whether the claim will be paid or not (e.g., based on an assignment or "result" determined regarding liability or responsibility), and/or a determination regarding how much will be paid (e.g., based on an estimated amount of damage, coverage limits, etc.).

II. Automated Accident Analysis Systems

Referring first to FIG. 1, a block diagram of a system 100 according to some embodiments is shown. In some embodiments, the system 100 may comprise a user device 102a that may be located within (as depicted in FIG. 1) or proximate to a vehicle 102b (or, in some cases, a building or structure such as a home or office). In some embodiments, the user device 102a and/or the vehicle 102b may be in communication, via a network 104, with one or more remote devices, such as a third-party device 106 and/or a server 110. According to some embodiments, the system 100 may comprise one or more sensors 116a-b. As depicted in FIG. 1, for example, the user device 102a may comprise (and/or be in communication with) a first sensor 116a and/or the vehicle 102b may comprise (and/or be in communication with) a second sensor 116b. In some embodiments, the system 100 may comprise a memory 140. As depicted in FIG. 1, in some embodiments the memory 140 may be disposed in and/or be coupled to the vehicle 102b. According to some embodiments, the memory 140 may also or alternatively be part of the user device 102a, the network 104, the third-party device 106, the server 110, and/or may comprise a stand-alone and/or networked data storage device such as a solid-state and/or non-volatile memory card (e.g., a Secure Digital (SD) card such as an SD Standard-Capacity (SDSC), an SD High-Capacity (SDHC), and/or an SD eXtended-Capacity (SDXC) and any various practicable form-factors such as original, mini, and micro sizes, such as are available from Western Digital Corporation of San Jose, Calif.). In some embodiments, the memory 140 may be in communication with and/or store data from one or more of the sensors 116a-b. As depicted in FIG. 1, any or all of the devices 102a-b, 106, 110, 116a-b, 140 (or any combinations thereof) may be in communication via the network 104.

Fewer or more components 102a-b, 104, 106, 110, 116a-b, 140 and/or various configurations of the depicted components 102a-b, 104, 106, 110, 116a-b, 140 may be included in the system 100 without deviating from the scope of embodiments described herein. In some embodiments, the components 102a-b, 104, 106, 110, 116a-b, 140 may be similar in configuration and/or functionality to similarly named and/or numbered components as described herein. In some embodiments, the system 100 (and/or portion thereof) may comprise an automatic accident analysis program, system, and/or platform programmed and/or otherwise configured to execute, conduct, and/or facilitate the method 400 of FIG. 4 herein, and/or portions thereof.

The user device 102a, in some embodiments, may comprise any type or configuration of computing, mobile electronic, network, user, and/or communication device that is or becomes known or practicable. The user device 102a may, for example, comprise one or more tablet computers, such as an iPad® manufactured by Apple®, Inc. of Cupertino, Calif., and/or cellular and/or wireless telephones or "smart" phones, such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, the user device 102a may comprise one or more devices owned and/or operated by one or more users, such as an automobile (and/or other vehicle, liability, personal, and/or corporate insurance customer) insurance customer and/or other accident victim and/or witness. According to some embodiments, the user device 102a may communicate with the server 110 via the network 104 to provide evidence and/or other data descriptive of an accident event and/or accident scene, as described herein. According to some embodiments, the user device 102a may store and/or execute specially programmed instructions (such as a mobile device application) to operate in accordance with embodiments described herein. The user device 102a may, for example, execute one or more mobile device programs that activate and/or control the first sensor 116a and/or the second sensor 116b to acquire accident-related data therefrom (e.g., accelerometer readings in the case that the first sensor 116a comprises an accelerometer of the user device 102a and/or bird's-eye view imagery/video in the case that the second sensor comprises a camera array of the vehicle 102b).

According to some embodiments, the vehicle 102b may comprise any type, configuration, style, and/or number of vehicles, such as, but not limited to, passenger automobiles (e.g., sedans, sports cars, Sports Utility Vehicles (SUVs), pickup trucks), trucks, vans, buses, tractors, construction equipment, agricultural equipment, airplanes, boats, and trains. In some embodiments, the vehicle 102b may comprise an automobile owned and/or operated by a user (not shown) that also owns and/or operates the user device 102a. According to some embodiments, the vehicle 102b may comprise the second sensor 116b, such as a proximity sensor, a global positioning sensor, an oxygen sensor, a traction sensor, an airbag sensor, a crash/impact sensor, a keyless-entry sensor, a tire pressure sensor, an optical sensor (such as a light sensor, a camera, or an Infrared Radiation (IR) sensor), and/or a Radio Frequency (RF) sensor (e.g., a Bluetooth® transceiver, and inductive field sensor, and/or a cellular or other signal sensor). In some embodiments, the second sensor 116b may comprise a "360°" or bird's-eye camera array and/or system, as described herein.

The network 104 may, according to some embodiments, comprise a Local Area Network (LAN; wireless and/or wired), cellular telephone, Bluetooth® and/or Bluetooth Low Energy (BLE), Near Field Communication (NFC), and/or Radio Frequency (RF) network with communication links between the server 110, the user device 102a, the vehicle 102b, the third-party device 106, the sensors 116a-b, and/or the memory 140. In some embodiments, the network 104 may comprise direct communications links between any or all of the components 102a-b, 106, 110, 116a-b, 140 of the system 100. The user device 102a may, for example, be directly interfaced or connected to one or more of the vehicle 102b and/or the controller device 110 via one or more wires, cables, wireless links, and/or other network components, such network components (e.g., communication links) comprising portions of the network 104. In some embodiments, the network 104 may comprise one or many other links or network components other than those depicted in FIG. 1. The user device 102a may, for example, be connected to the server 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-b, 106, 110, 116a-b, 140 of the system 100. The network 104 may comprise one or more cellular telephone networks with communication links between the user device 102a, the vehicle 102b, and the server 110, for example, and/or may comprise a BLE, NFC, and/or "personal" network comprising short-range wireless communications between the user device 102a and the vehicle 102b, for example.

The third-party device 106, in some embodiments, may comprise any type or configuration of a computerized processing device, such as a PC, laptop computer, computer server, database system, and/or other electronic device, devices, or any combination thereof. In some embodiments, the third-party device 106 may be owned and/or operated by a third-party (i.e., an entity different than any entity owning and/or operating any of the user device 102a, the vehicle 102b, and/or the server 110). The third-party device 106 may, for example, be owned and/or operated by a data and/or data service provider, such as Dun & Bradstreet® Credibility Corporation (and/or a subsidiary thereof, such as Hoovers™), Deloitte® Development, LLC, Experian™ Information Solutions, Inc., and/or Edmunds.com®, Inc. In some embodiments, the third-party device 106 may supply and/or provide data, such as location data, encryption/decryption data, configuration data, and/or preference data to the server 110, the user device 102a, the vehicle 102b, and/or the sensors 116a-b. In some embodiments, the third-party device 106 may comprise a plurality of devices and/or may be associated with a plurality of third-party entities. According to some embodiments, the third-party device 106 may comprise the memory 140 (or a portion thereof), such as in the case the third-party device 106 comprises a third-party data storage service, device, and/or system, such as the Amazon® Simple Storage Service (Amazon® S3™) available from Amazon.com, Inc. of Seattle, Wash. or an open-source third-party database service, such as MongoDB™ available from MongoDB, Inc. of New York, N.Y.

In some embodiments, the server 110 may comprise an electronic and/or computerized controller device, such as a computer server and/or server cluster communicatively coupled to interface with the user device 102a and/or the vehicle 102b (directly and/or indirectly). The server 110 may, for example, comprise one or more PowerEdge™ M910 blade servers manufactured by Dell®, Inc. of Round Rock, Tex., which may include one or more Eight-Core Intel® Xeon® 7500 Series electronic processing devices. According to some embodiments, the server 110 may be located remotely from one or more of the user device 102a and the vehicle 102b. The server 110 may also or alternatively comprise a plurality of electronic processing devices located at one or more various sites and/or locations (e.g., a distributed computing and/or processing network).

According to some embodiments, the server 110 may store and/or execute specially-programmed instructions to operate in accordance with embodiments described herein. The server 110 may, for example, execute one or more programs that facilitate and/or cause the automatic detection, verification, data capture, and/or data analysis of an accident event, as described herein. According to some embodiments, the server 110 may comprise a computerized processing device, such as a PC, laptop computer, computer server, and/or other network or electronic device, operated to manage and/or facilitate automatic accident analysis in accordance with embodiments described herein.

According to some embodiments, the sensors 116a-b may comprise any type, configuration, and/or quantity of sensor devices that are or become known or practicable. In some embodiments, the first sensor 116a may comprise an accelerometer, gyroscope, locational positioning device, image, audio, and/or video capture and/or recording device of the user device 102a (e.g., a "smart" phone). According to some embodiments, the second sensor 116b may comprise various vehicle sensors, such as brake sensors, tire pressure sensors, temperature sensors, locational positioning devices, door sensors, and/or one or more cameras, such as a backup camera, an interior/cabin/passenger camera, and/or a camera array, such as a bird's-eye or "360°" view array. The second sensor 116b may, in some embodiments, be integrated into the vehicle 102b as Original Equipment Manufacturer (OEM) devices installed in the vehicle 102b during the manufacture thereof. In some embodiments, the second sensor 116b may comprise an after-market sensor and/or sensor system, such as a Vacron 360° Dash Camera having a single four (4) lens camera and available from the Fuho Technology Company, Ltd. of Shen Zhen, China or a Wiseup™ Car Vehicle 360 Degree Panoramic View System having four (4) separately mounted and interconnected cameras and available from the Shenzhen Dawu Times Technology Co., Ltd. of Shen Zhen, China.

In some embodiments, the server 110, the third-party device 106, the sensors 116a-b, the user device 102a, and/or the vehicle 102b may be in communication with the memory 140. The memory 140 may store, for example, mobile device application data, vehicle data, user/driver data, sensor data, location data (such as coordinates, distances, etc.), security access protocol and/or verification data, and/or instructions that cause various devices (e.g., the server 110, the third-party device 106, the user device 102a, and/or the vehicle 102b) to operate in accordance with embodiments described herein. In some embodiments, the memory 140 may comprise any type, configuration, and/or quantity of data storage devices that are or become known or practicable. The memory 140 may, for example, comprise an array of optical and/or solid-state hard drives configured to store user identifier, vehicle identifier, device identifier, and/or location data provided by (and/or requested by) the user device 102a and/or the server 110, and/or various operating instructions, drivers, etc. While the memory 140 is depicted as a stand-alone component of the system 100 in FIG. 1, the memory 140 may comprise multiple components. In some embodiments, a multi-component memory 140 may be distributed across various devices and/or may comprise remotely dispersed components. Any or all of the user device 102a, the vehicle 102b, the third-party device 106, and/or the server 110 may comprise the memory 140 or a portion thereof, for example, and/or one or more of the sensors 116a-b may comprise the memory 140 or a portion thereof.

Figure 2:
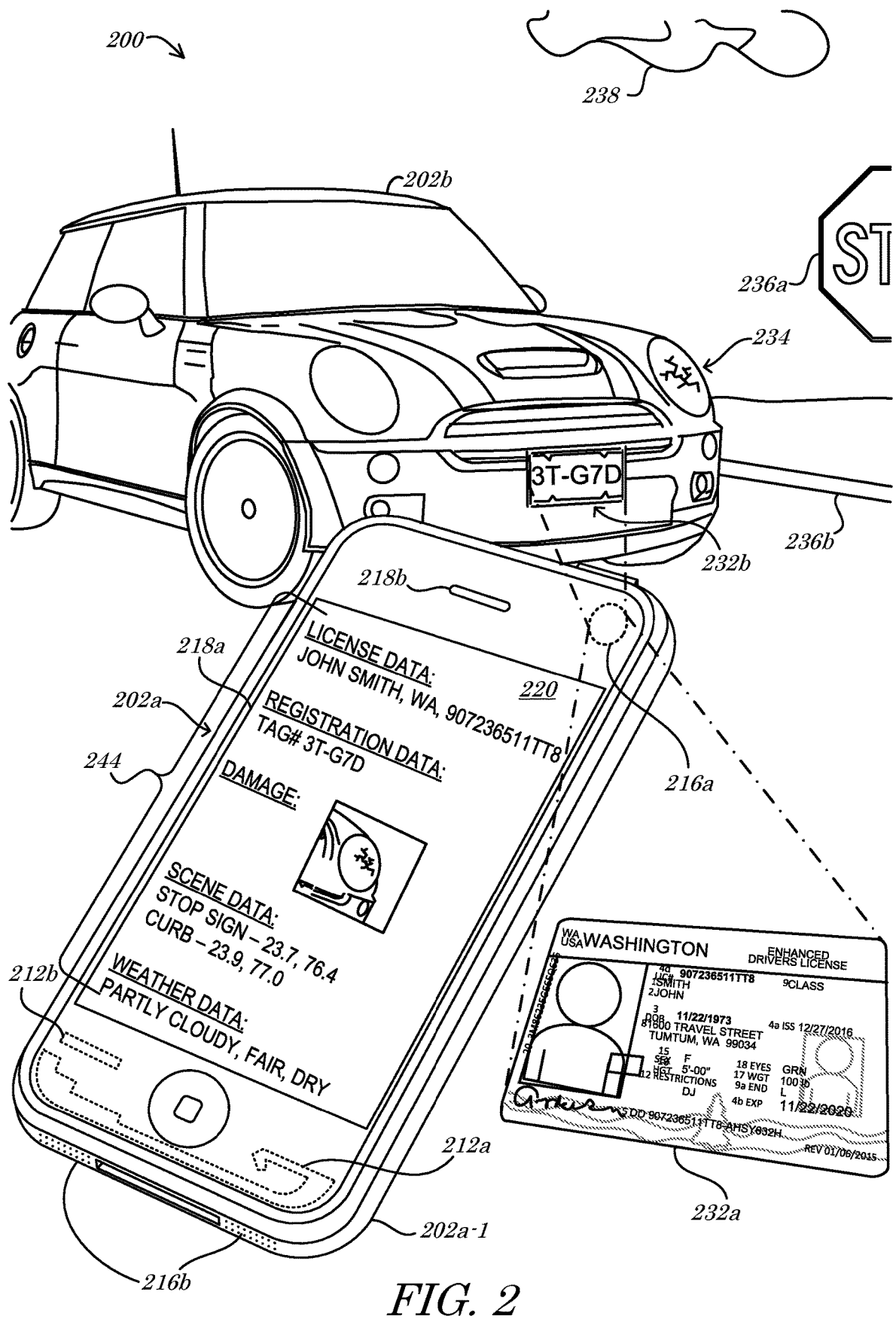
FIG. 2 is a perspective diagram of a system according to some embodiments.

Turning to FIG. 2, a perspective diagram of system 200, according to some embodiments, is shown. In some embodiments, the system 200 may comprise a mobile electronic device 202a and/or a vehicle 202b. In some embodiments, the mobile electronic device 202a may comprise a housing 202a-1 that retains, houses, and/or is otherwise coupled to communication antenna 212a-b (e.g., a first antenna 212a such as a cellular network or long-range antenna and/or a second antenna 212b such as a Wi-Fi®, Bluetooth®, and/or other short-range antenna), input devices 216a-b (e.g., a first input device 216a, such as a camera and/or a second input device 216b, such as a microphone), and/or output devices 218a-b (e.g., a first output device 218a, such as a display screen, and/or a second output device 218b, such as a speaker). According to some embodiments, the mobile electronic device 202a (and/or the display screen 218a thereof) may output a GUI 220 that provides output from and/or accepts input for, a mobile device application executed by the mobile electronic device 202a.

In some embodiments, the mobile electronic device 202a (and/or the input devices 216a-b thereof) may capture, sense, record, and/or be triggered by objects, data, and/or signals at or near an accident scene (e.g., the depicted setting of the system 200 in FIG. 2). The camera 216a of the mobile electronic device 202a may, for example, capture images of one or more textual indicia 232a-b within visual proximity to the mobile electronic device 202a. At the accident scene, for example, the camera 216a may capture an image (and/or video) of an identification card, such as the depicted vehicle operator's license 232a (e.g., a driver's license and/or other identification card, such as an insurance card), and/or an identifier of the vehicle 202b, such as the depicted license plate number 232b (e.g., a Vehicle Identification Number (VIN), make, model, and/or other human or computer-readable indicia).

According to some embodiments, the camera 216a may capture image data of damage 234 to the vehicle 202b, roadway features 236a-b, such as road signs 236a (and/or other roadway instructions and/or guidance objects or devices) and/or curbs 236b (e.g., roadway edges, centerlines, lanes, etc.), and/or environmental conditions 238 (e.g., cloud cover, rain, puddles, snow). In some embodiments, other input devices 216a-b and/or sensors (not separately depicted in FIG. 2) may also or alternatively capture data from the accident scene. The microphone 216b may, for example, capture sound information indicative of environmental conditions 238 such as rainfall, sounds of cars passing through puddles, sounds of vehicles traveling over gravel, etc. In some embodiments, captured data may be in the form of electronic signals, signal detection, signal strength readings, and/or signal triangulation data. The short-range antenna 212b may detect, measure, and/or triangulate, for example, one or more signals from the vehicle 202b, the road sign 236a (e.g., an RF-enabled roadway device), and/or other devices, such as a second mobile electronic device (not shown), e.g., located within the vehicle 202b and broadcasting a short-range communications discovery signal (such as a Bluetooth® discovery signal). According to some embodiments, the mobile electronic device 202a may communicate wirelessly (e.g., via the short-range antenna 212b) with the vehicle 202b to acquire (e.g., query) sensor data of the vehicle stored in an electronic storage device (not shown in FIG. 2) therein.

In some embodiments, any or all information captured, recorded, and/or sensed at, near, and/or otherwise descriptive of the accident scene by the mobile electronic device 202a (and/or by the vehicle 202b) may be processed and/or analyzed. The data may be analyzed by an application executed by the mobile electronic device 202a, for example, and/or may be transmitted to a remote server (not shown in FIG. 2) that conducts data analysis routines. According to some embodiments, the data analysis may result in a definition of one or more textual and/or other human-readable data elements 244 that may be output to a user (not shown) via the GUI 220 generated on the display screen 218a. As depicted in FIG. 2, for example, the data elements 244 may comprise data from the operators license 232a and/or the license plate number 232b may be optically recognized, converted into digital character information, and output via the GUI 220. In some embodiments, the GUI 220 may also or alternatively output data elements 244 comprising an image (e.g., a "thumbnail" image) of the damage 234, derived location information (e.g., based on spatial analysis of image data) for the road sign 236a and/or the curb 236b, and/or a textual description (e.g., a qualitative description) of the weather conditions 238. In some embodiments, the data elements 244 may be utilized to trigger and/or conduct various processes, such as the method 400 of FIG. 4 herein, and/or portions thereof. The data elements 244 may be utilized in conjunction with an application of stored rules, for example, to derive an accident result, such as a determination regarding causation of the accident, an estimate of damage caused by the accident, and/or a determination of whether (and/or how much) an insurance claim in response to the accident will be approved or denied.

In some embodiments, the mobile electronic device 202a may comprise a smart mobile phone, such as the iPhone® 8 or a later generation iPhone®, running iOS 10 or a later generation of iOS, supporting Location Services. The iPhone® and iOS are produced by Apple Inc., however, the present invention is not limited to any particular portable computing device or smart mobile phone. For example, the mobile electronic device 202a may take the form of a laptop computer, a handheld computer, a palm-size computer, a pocket computer, a palmtop computer, a Personal Digital Assistant (PDA), a tablet computer, an electronic organizer, a mobile phone, a portable/mobile phone, a feature phone, a smartphone, a tablet, a portable/mobile data terminal, an iPhone®, an iPad®, an iPod®, an Apple® Watch (or other "smart" watch), and other portable form-factor devices by any vendor containing at least one Central Processing Unit (CPU) and a wireless communication device (e.g., the communication antenna 212a-b).

According to some embodiments, the mobile electronic device 202a runs (i.e., executes) a mobile device software application ("app") that causes the generation and/or output of the GUI 220. In some embodiments, the app works with Location Services supported by an iOS operating system executing on the mobile electronic device 202a. The app may include, comprise, and/or cause the generation of the GUI 220, which may be utilized, for example, for transmitting and/or exchanging data through and/or via a network (not shown in FIG. 2; e.g., the Internet). In some embodiments, once the app receives captured data from an input device 216a-b, the app in turn transmits the captured data through a first interface for exchanging data (not separately depicted in FIG. 2) and through the network. The network may, in some embodiments, route the data out through a second interface for exchanging data (not shown) to a remote server. According to some embodiments, the app includes specially-programmed software code that includes one or more address identifiers such as Uniform Resource Locator (URL) addresses, Internet Protocol (IP) address, etc., that point to and/or reference the server.

Fewer or more components 202a-b, 202a-1, 212a-b, 216a-b, 218a-b, 220, 232a-b, 234, 236a-b, 238, 244 and/or various configurations of the depicted components 202a-b, 202a-1, 212a-b, 216a-b, 218a-b, 220, 232a-b, 234, 236a-b, 238, 244 may be included in the system 200 without deviating from the scope of embodiments described herein. In some embodiments, the components 202a-b, 202a-1, 212a-b, 216a-b, 218a-b, 220, 232a-b, 234, 236a-b, 238, 244 may be similar in configuration and/or functionality to similarly named and/or numbered components as described herein. In some embodiments, the system 200 (and/or portion thereof) may comprise an automatic accident analysis program, system, and/or platform programmed and/or otherwise configured to execute, conduct, and/or facilitate the method 400 of FIG. 4 herein, and/or portions thereof.

Figure 3:
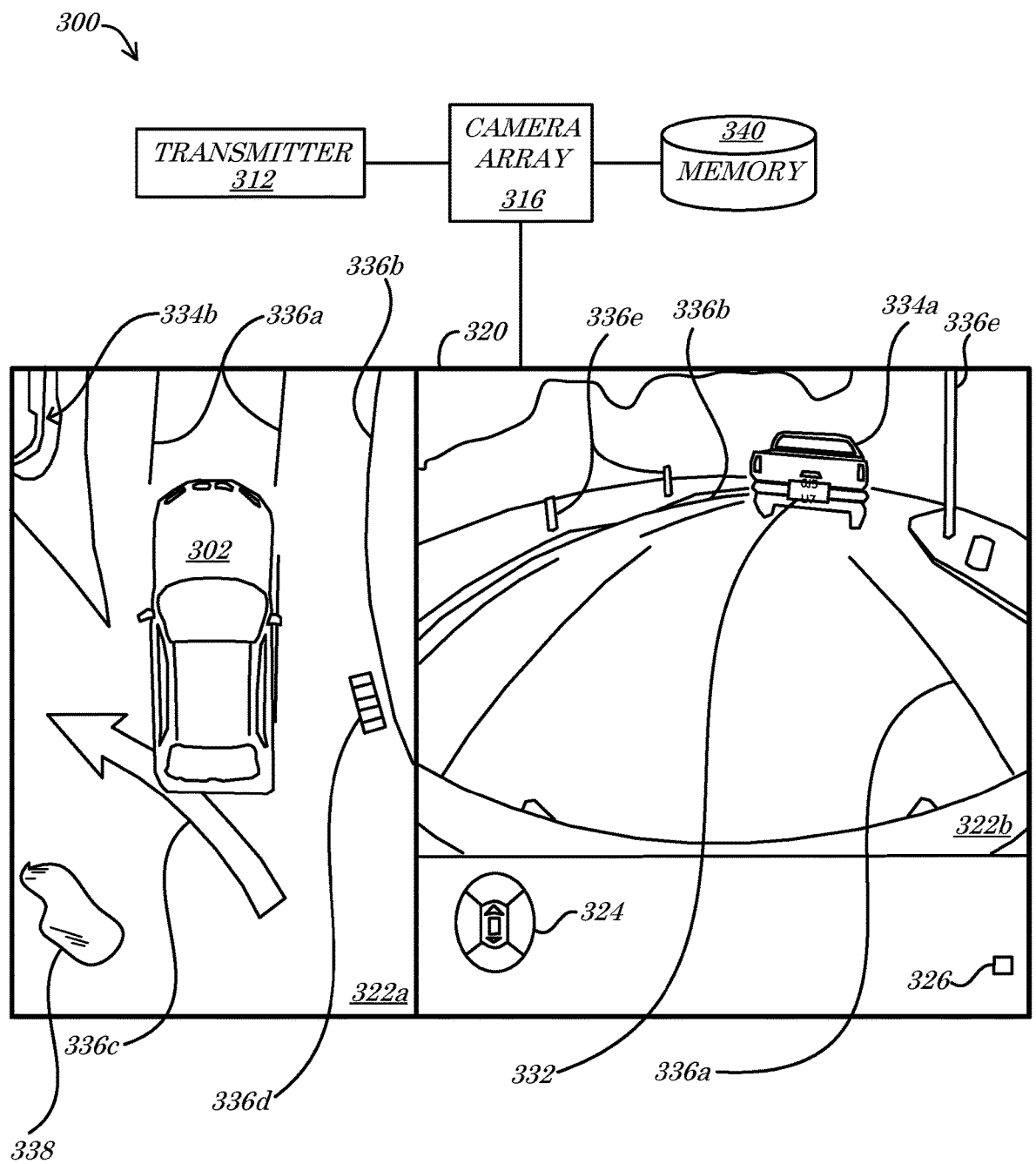
FIG. 3 is a block diagram of a system according to some embodiments.

Referring now to FIG. 3, a block diagram of a system 300 according to some embodiments is shown. In some embodiments, the system 300 may comprise a vehicle 302 and a transmitter 312 in communication with a camera array 316. The camera array 316 may capture, for example, a plurality of images, audio, and/or video of a particular area in and/or around the vehicle (e.g., the vehicle 102b, 202b of FIG. 1 and/or FIG. 2 herein) and/or may provide such data for generation of an interface 320. As depicted in FIG. 3, the interface 320 may comprise a first view 322a that depicts a "360°" or bird's-eye view of an area around the vehicle 302 and/or a second view 322b that depicts an area behind (or in front of) the vehicle 302. According to some embodiments, the interface 320 may comprise an image navigation button 324 and/or a record button or indicator 326. In some embodiments, the output of the interface 320 (e.g., the first view 322a and/or the second view 322b) may be defined and/or generated based on data provided by the camera array 316. According to some embodiments, the output of the interface 320 may be provided via a display device (not explicitly shown) of the vehicle 302 and/or may be transmitted to one or more other devices (not shown; e.g., a remote server 110 and/or a user/mobile electronic device 102a, 202a of FIG. 1 and/or FIG. 2 herein).

In some embodiments, information descriptive of the area surrounding the vehicle 302 (e.g., an accident scene in the case of an accident) may be captured, identified, and/or analyzed. Textual information, such as a license plate number 332 of a first vehicle 334a, may be identified and "recognized" electronically via an optical character recognition program or application, for example. According to some embodiments, other vehicles 334a-b in the area may be identified from the images/video via execution of a vehicle, object, and/or shape-based electronic recognition routine or application. In some embodiments, different routines and/or algorithms may be utilized based on the type of image/video being analyzed. In the case of the first vehicle 334a in the front/rear "fisheye" or perspective image of the second view 322b, for example, a first object detection algorithm utilizing first rules for perspective shape analysis may be utilized, while in the case of a second vehicle 334b (or portion thereof, as depicted in FIG. 2) in the "360°" or bird's-eye image of the first view 322a, a second object detection algorithm utilizing second rules for overhead view shape analysis may be utilized.

According to some embodiments, image/video features indicative and/or descriptive of roadway features 336a-e may be identified. Object and/or pattern recognition algorithms and/or applications may be utilized, for example, to identify lane/parking lines 336a, curbs 336b, pavement markings 336c, in-road obstacles 336d (e.g., a drainage basin, as depicted), and/or near-road obstacles 336e (e.g., posts, poles, trees, etc.). In some embodiments, weather-related data may also or alternatively be gathered and/or identified from the data of the camera array 316. Object and/or pattern recognition algorithms and/or applications may be utilized to detect and/or identify puddles 338 of water (wet and/or frozen), oil, and/or other indications of weather and/or other activities that may affect (or may have affected) roadway travel.

In some embodiments, identification of the various elements 332, 334a-b, 336a-e, 338 from the images/video may comprise estimating and/or identifying locations of the various elements 332, 334a-b, 336a-e, 338. A spatial recognition algorithm and/or application may be utilized, for example, to derive an estimated distance between the vehicle 302 and (i) various lane/parking lines 336a, (ii) other vehicles 334a-b, (iii) in-road obstacles 336d, and/or (iv) weather-related objects or areas, such as the puddle 338. According to some embodiments, distances between various elements 332, 334a-b, 336a-e, 338 may be derived, such as a distance of the first vehicle 334a from a curb 336b and/or a distance between two poles 336e. In some embodiments, other spatial and/or relational location data may be calculated and/or derived. An angle or orientation of the vehicle 302 with respect to the directional arrow pavement marking 336c may be calculated, for example, and/or a direction of travel (and/or speed, with respect to video image data) of the first vehicle 334a with respect to the vehicle 302 and/or other objects may be calculated.

According to some embodiments, derived and/or calculated data based on the various elements 332, 334a-b, 336a-e, 338 from the images/video may be output via the interface 320 (not shown). Markings showing distances, speeds, and/or other derived data may, for example, be overlaid on the image data output by the interface 320. In some embodiments, the derived data may be utilized to calculate, compute, and/or determine an accident result. In the case of an accident, for example, various speeds, distances, orientations, and/or object locations may be utilized to reconstruct likely accident scenarios, e.g., utilizing one or more physics and/or accident reconstruction algorithms and/or applications. In some embodiments, the analysis of the data may be utilized to generate a virtual accident scene (not shown), e.g., an electronic, spatially-oriented depiction of accident scene details, such as object locations, orientations, etc. In some embodiments, the virtual accident scene may be temporally constructed and/or indexed such that accident scene details may be viewed in relation to their positions, qualities, orientations, and/or characteristics at different points in time. According to some embodiments, the image/video data and/or the derived/calculated data may be stored in a database 340, e.g., in communication with the camera array 316 and/or the transmitter 312. In some embodiments, the image/video data and/or the derived/calculated data may be transmitted to one or more other devices (not shown in FIG. 3) and/or such other devices may be provided with access to the memory 340 to retrieve and/or query the stored data.

Fewer or more components 302, 312, 316, 320, 322a-b, 324, 326, 332, 334a-b, 336a-e, 338, 340 and/or various configurations of the depicted components 302, 312, 316, 320, 322a-b, 324, 326, 332, 334a-b, 336a-e, 338, 340 may be included in the system 300 without deviating from the scope of embodiments described herein. In some embodiments, the components 302, 312, 316, 320, 322a-b, 324, 326, 332, 334a-b, 336a-e, 338, 340 may be similar in configuration and/or functionality to similarly named and/or numbered components as described herein. In some embodiments, the system 300 (and/or portion thereof) may comprise an automatic accident analysis program, system, and/or platform programmed and/or otherwise configured to execute, conduct, and/or facilitate the method 400 of FIG. 4 herein, and/or portions thereof.

III. Automated Accident Analysis Processes

Figure 4:
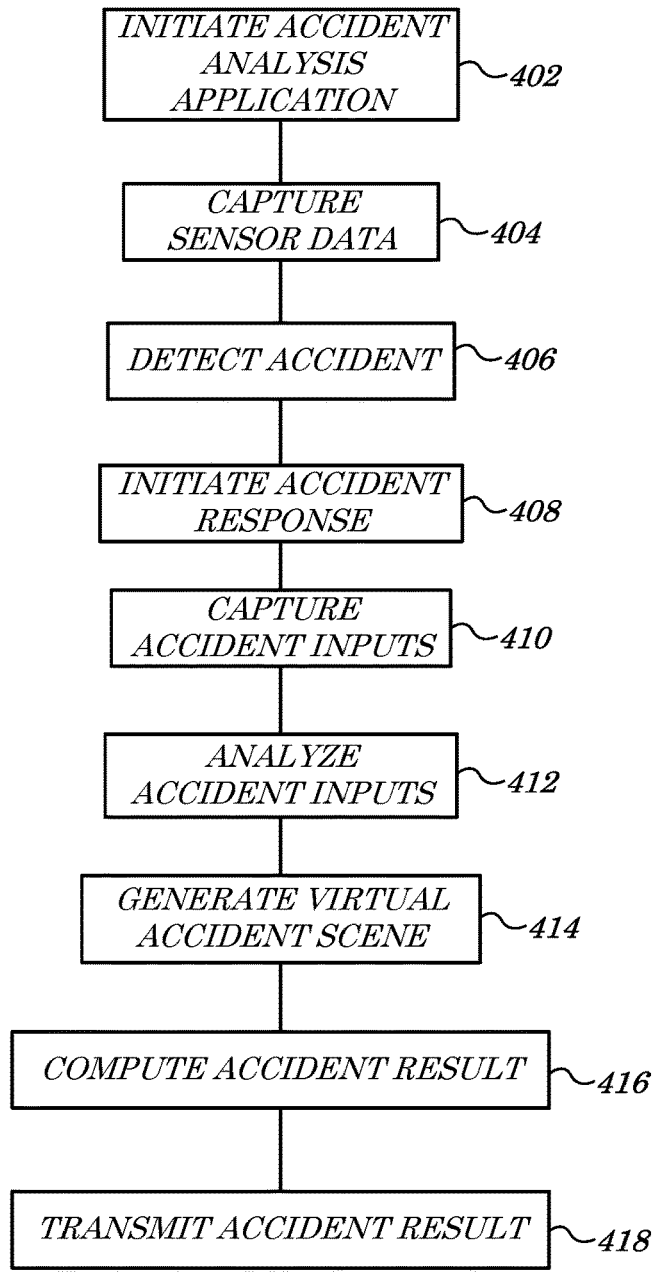
FIG. 4 is a flow diagram of a method according to some embodiments.

Turning now to FIG. 4, a flow diagram of a method 400 according to some embodiments is shown. In some embodiments, the method 400 may be performed and/or implemented by and/or otherwise associated with one or more specialized and/or specially-programmed computers (e.g., the user/mobile electronic device 102a, 202a and/or the server 110 of FIG. 1 and/or FIG. 2 herein), computer terminals, computer servers, computer systems and/or networks, and/or any combinations thereof (e.g., by one or more multi-threaded and/or multi-core processing units of an insurance company claims data processing system). In some embodiments, the method 400 may be embodied in, facilitated by, and/or otherwise associated with various input mechanisms and/or interfaces (such as the interfaces 220, 320, 520a-c, 620 of FIG. 2, FIG. 3, FIG. 5A, FIG. 5B, FIG. 5C, and/or FIG. 6 herein).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 140, 340, 640, 740a-e of FIG. 1, FIG. 3, FIG. 6, FIG. 7A, FIG. 7B, FIG. 7C, FIG. 7D, and/or FIG. 7E herein) may store thereon instructions that when executed by a machine (such as a computerized processor) result in performance according to any one or more of the embodiments described herein.

According to some embodiments, the method 400 may comprise initiating (e.g., by an electronic processing device) an accident analysis application, at 402. A user of a mobile electronic device and/or of a server may, for example, open, run, execute, and/or allow or enable a software program and/or application programmed to automatically detect, verify, and/or analyze an accident (or other event). In some embodiments, a specially-programmed mobile device application may be executed and/or initiated on a mobile device of a user, such as a smart phone device. According to some embodiments, the initiation of the application may cause an initialization of a monitoring loop routine that actively monitors sensor data from one or more sensors. The application may comprise a "listener" module, for example, that continually or periodically checks for and/or acquires sensor data. In some embodiments, the initialization may comprise pairing one or more sensors and/or mobile devices, registering a device with an online service, and/or otherwise inputting, defining, and/or storing various configuration, default, and/or initialization data item values. According to some embodiments, the initiating may be accomplished automatically, e.g., upon device startup, and/or upon occurrence of a triggering event (e.g., time and/or location based triggers).

In some embodiments, the method 400 may comprise capturing (e.g., by the electronic processing device and/or via a sensor array) sensor data, at 404. The "listener" module may identify when sensor data and/or sensor communications or connectivity are available, for example, and automatically upload, download, query, copy, and/or retrieve some or all of the sensor data. According to some embodiments, the application may be configured to automatically record a rolling time-based set of sensor data, such as a rolling five (5) minute-loop of image, audio, and/or video data retrieved from a camera sensor and/or camera array. In some embodiments, the sensor data may be automatically captured after device and/or application initialization and before detection and/or occurrence of an accident event. In such a manner, for example, pre-accident data may be automatically captured, acquired, and/or recorded (e.g., in one or more local and/or remote data storage devices). In some embodiments, the data captured at 404 may comprise first input that is received from one or more sensors associated with an insurance customer. First input indicative of a value of a sensor reading descriptive of an accident event (or a pre-accident event area or object) may be received via a wireless transceiver device, for example, from a vehicle.

According to some embodiments, the method 400 may comprise detecting (e.g., by the electronic processing device) an accident, at 406. The application may compare, for example, the sensor data captured at 404 (e.g., first input value of sensor reading) to one or more stored thresholds (e.g., a numeric threshold) and/or rules to determine if the sensor readings/values exceed predetermined levels. In the case of a mobile device accelerometer sensor, for example, the application may compare accelerometer readings to acceptable reading levels and determined that one or more readings exceed the acceptable reading level threshold—e.g., indicating excessive acceleration/deceleration that may be descriptive of an accident event. In the case of a vehicle air bag and/or other system status sensor, the application may receive an indication that a status has changed, where the status change is not stored as an 'acceptable' status and/or is specifically stored as an 'emergency' or accident indicative status—e.g., an air bag status changing from active or "ready" to "deployed". In some embodiments, in the case that a comparison of sensor data to stored thresholds and/or rules causes a determination of an "accident" status, a flag may be updated in a memory or database and/or may be transmitted to various electronic components and/or devices (e.g., as an accident alert signal). The application may, for example, cause the second version of the interface 520b and/or the incident detection prompt 520-9 of FIG. 5B to be output to a user in the case that a comparison of data levels to thresholds/rules is indicative of a potential accident event. According to some embodiments, the rules (e.g., accident identification/detection/verification rules) may be applied to the first input received by the application to identify the accident event.

In some embodiments, the method 400 may comprise initiating (e.g., by the electronic processing device) an accident response, at 408. Stored rules may govern, for example, an appropriate and/or desired response based on various attributes of the accident event. A type of the accident (e.g., based on sensor readings and/or stored type-analysis rules) may be determined, for example, and the response may be based on the accident type. In the case of a serious accident, such as a rollover crash (e.g., as potentially indicated by a gyroscopic sensor of a mobile device and/or vehicle), for example, emergency services may be automatically contacted, alerted, and/or summoned, without requiring or waiting for any driver/user input. In the case of a minor accident, such as a "fender bender" (e.g., as indicated by an affirmative indication of an accident by the driver/user and an "offline" status of a proximity sensor mounted on a bumper of the drivers vehicle), a text message may be sent to a family member and/or a listing of local repair shops, claim centers, etc., may be provided (e.g., based on a location-based database query utilizing the vehicle's current location as a variable). In some embodiments, an accident response may comprise a generation, definition, and/or identification of an accident and/or incident checklist (e.g., from a plurality of checklists and/or checklist components stored in a memory device), and/or the provision (e.g., outputting) of the checklist to the driver/user/customer (e.g., the accident checklist 520-11 of FIG. 5C herein). In such a manner, for example, a listing of required (or suggested) action items or an "accident response plan" may be developed and output to a user to facilitate guidance through the post-accident process. In some embodiments, an accident response may comprise a triggering or initiation of an insurance claims process, e.g., by transmitting accident detection and/or detail information to a remote insurance claims device.

According to some embodiments, the method 400 may comprise capturing (e.g., by the electronic processing device and/or via the sensor array) accident inputs, at 410. Accident inputs may comprise, for example, data entered by a driver/user via a provided interface (such as answers to checklist questions and/or queries), pre-accident sensor data from one or more mobile device, vehicle, and/or other sensors, post-accident sensor data from one or more mobile device, vehicle, and/or other sensors, data identified, detected, and/or calculated based on sensor data, third-party data (e.g., weather service data, car manufacturer data, other insurance company data), and/or other pre-stored data (e.g., driver/user/customer insurance policy, identifier, and/or account information). In some embodiments, accident inputs may be automatically identified and/or captured (e.g., based on a set of accident analysis rules; such as by automatically activating a sensor device of a vehicle in wireless communication with the mobile electronic device executing the application). Vehicle bird's-eye camera array video data may be automatically accessed and/or retrieved, for example (e.g., for certain types of accidents and/or when certain types of vehicles or sensors are available), upon occurrence and/or identification of an accident event (e.g., at 406). According to some embodiments, capturing of data relevant to the accident event may comprise automatically detecting other electronic devices in proximity of the accident scene (e.g., via signal identification, strength, and/or triangulation measurements), automatically connecting a mobile device to a vehicle and downloading vehicle status and/or recorded vehicle information, storing timestamp data, and/or accessing, identifying, and/or recording other device data, such as device application execution history data, event logs, and/or a log of the status of the application itself. In the case that the application was initiated (e.g., at 402) prior to the accident, for example, it may be identified that the application was paused or exited before, during, or after the accident. It may be inferred, for example, that if the application was paused or suspended, a different application must have been utilized on the mobile device. Activation and/or usage events for other applications may be captured and/or stored. According to some embodiments, any or all accident evidence or data may be stored through the application, e.g., in a directory native to the application. In such a manner, for example, the user of the mobile device may only be able to access the evidence (e.g., images/video) through the application, which may be programmed to limit access and/or prevent editing, such as to establish a chain of evidence for any recorded information. If images taken by a mobile device were stored in the mobile device's default photo storage location, for example, they may be accessed, edited, and/or deleted at the will of the user. In the case they are only accessible through the application, however (such as by being stored in a proprietary directory location and/or being encrypted and/or scrambled), the accuracy and/or integrity of the evidence may be verified and/or preserved by the application.

In some embodiments, the method 400 may comprise analyzing (e.g., by the electronic processing device) the accident inputs, at 412. Accident inputs may be processed utilizing stored rules (e.g., accident analysis rules) and/or analysis modules (such as mathematical models, physics modeling, etc.), for example, to identify and/or estimate relevancy of captured data and/or relationships between captured data elements. According to some embodiments, video, audio, and/or image evidence may be analyzed to calculate estimated distances between objects at the accident scene and/or orientations and/or positions of objects at or near the scene. Image analysis may include object, facial, pattern, and/or spatial recognition analysis routines that, e.g., identify individuals at the scene, identify vehicles at the scene, identify roadway features, obstacles, weather conditions, etc. Signal analysis may be utilized, in some embodiments, to identify other electronic devices at or near the scene (e.g., other smart phones, cell towers, traffic monitoring devices, traffic cameras, traffic radar devices, etc.). According to some embodiments, image and/or sensor analysis may be utilized to estimate accident damage by itemizing vehicle parts (or non-vehicle parts, such as structures or other obstacles) that visually appear to be damaged. In some embodiments, object (e.g., vehicle) movement, paths, and/or directions, or speeds may be estimated by analyzing locations at different points in time.

According to some embodiments, the method 400 may comprise generating (e.g., by the electronic processing device) a virtual accident scene, at 414. Relative (e.g., one vehicle being three (3) feet from another vehicle) and/or absolute location (e.g., GPS coordinates) data may be utilized, for example, to plot object boundaries and/or locations on a virtual representation (e.g., a digital map) of the accident scene. A digital terrain, locational, and/or elevation model may be generated and/or calculated, for example, and utilized to generate one or more graphical representations (e.g., a simulation) of the accident scene. In some embodiments, the virtual accident scene may comprise graphical representations of vehicles (cars, trains, bicycles, etc.), individuals, obstacles (trees, catch basins, utility poles and/or structures, animals, etc.), object travel paths, directions, orientations, and/or object status and/or characteristic data (e.g., damage levels, speeds, ownership, number of passengers, etc.). According to some embodiments, the virtual accident scene may be utilized in the analysis at 412 and/or additional analysis may be conducted based on the virtual accident scene generated based on the analysis at 412. According to some embodiments, accident analysis rules may govern how the captured data is analyzed (e.g., including mathematical formulas, mathematical models, logical analysis algorithms, etc.).

In some embodiments, the method 400 may comprise calculating (e.g., by the electronic processing device) an accident result, at 416. Based on the analysis at 412 and/or the virtual accident scene generated at 414, for example, one or more rules and/or logic routines may be applied to determine (i) which party (or parties) is responsible for the accident (e.g., causation), (ii) contributing factors to the accident (e.g., weather, brake failure, excessive speed, poor visibility, poor road design/layout, obstacle locations, etc.), (iii) how much damage has been done to various vehicles and/or objects due to the accident (e.g., a monetary and/or other quantitative metric), and/or (iv) how much should be paid for an insurance claim based upon the accident event (e.g., based upon insurance policy parameters, causation results, logical claim analysis rules, etc.). According to some embodiments, one or more lookup tables and/or other data sources may be queried to identify values associated with different levels of causation, vehicle parts and/or labor amounts, and/or claims payment rules.

According to some embodiments, the method 400 may comprise transmitting (e.g., by the electronic processing device and/or a wireless transceiver device, and/or via an electronic communications network) the accident result, at 418. In the case that the accident result comprises a determination and/or quantification of accident causation or fault, for example, the result may be transmitted to the appropriate authorities and/or to an insurance company claim system and/or representative. In the case that the result comprises a listing of damaged parts and/or a monetary estimate of damage, the accident result may be transmitted to a repair center, appraisal specialist, parts dealer, manufacturer, etc. In some embodiments, a likelihood of fault of an insurance customer may be multiplied by the estimated damage (e.g., to a vehicle of the insurance customer) amount to calculate an amount that the insurance claims handling process should provide in response to a claim. According to some embodiments, the detection of the accident and/or transmitting may comprise an initiation of a claims handling process (e.g., by automatically dialing an insurance company claims telephone hotline and/or by automatically uploading accident information to an automated claims handling platform managed by a remote insurance company server device).

IV. Automated Accident Analysis Interfaces

Figure 5A:
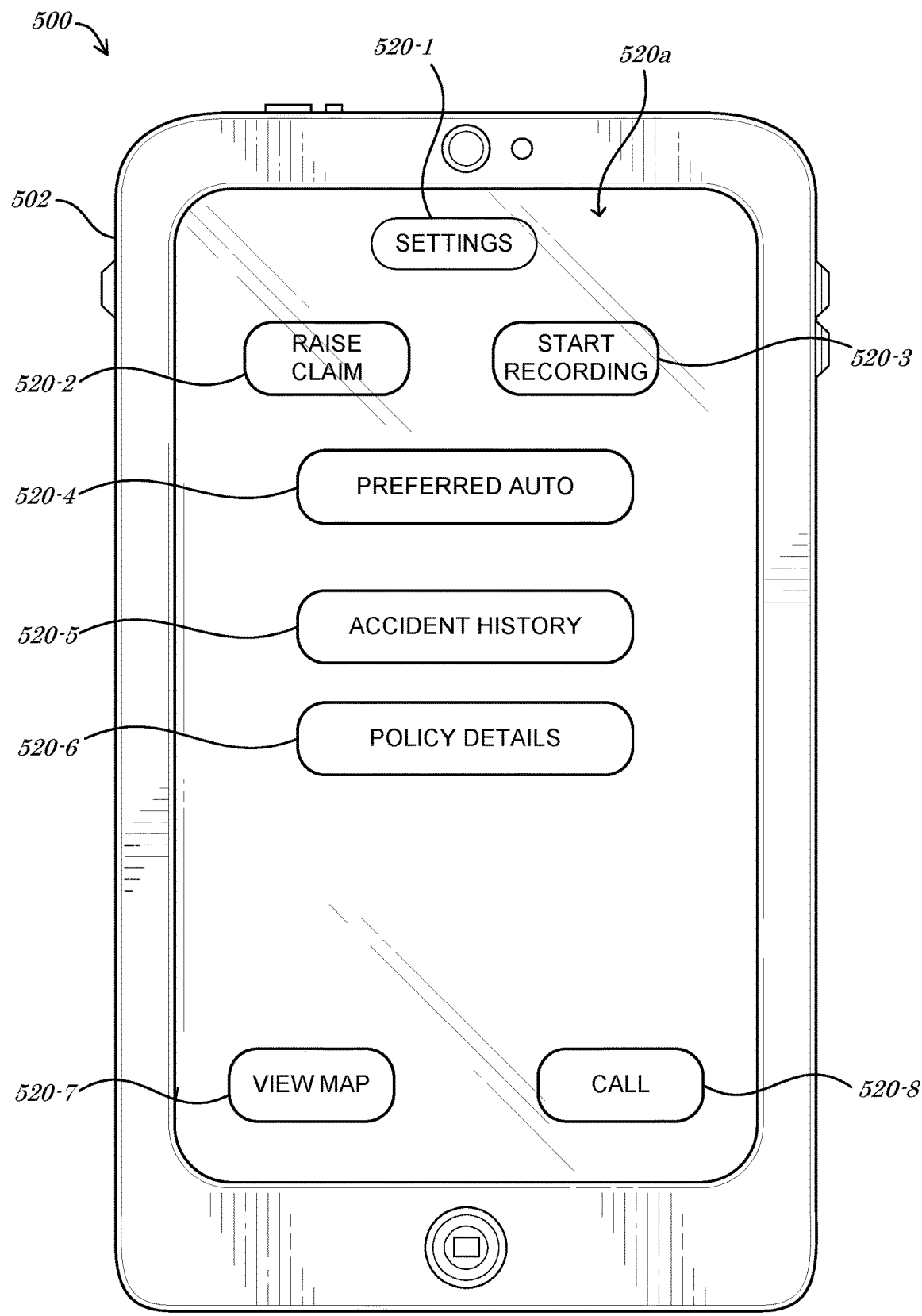
FIG. 5A, FIG. 5B, and FIG. 5C are diagrams of a system depicting example interfaces according to some embodiments.
Figure 5B:
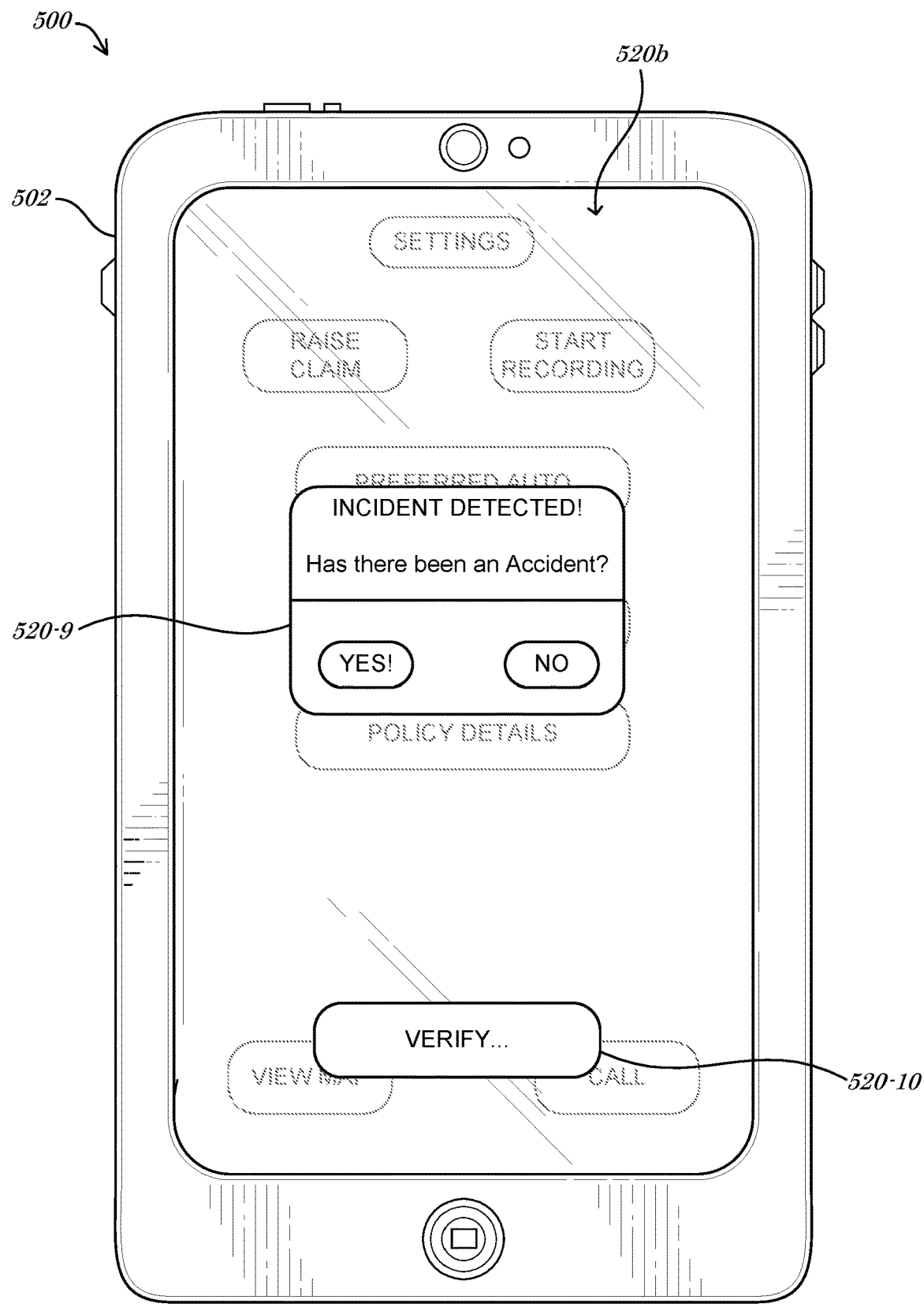
Figure 5C:
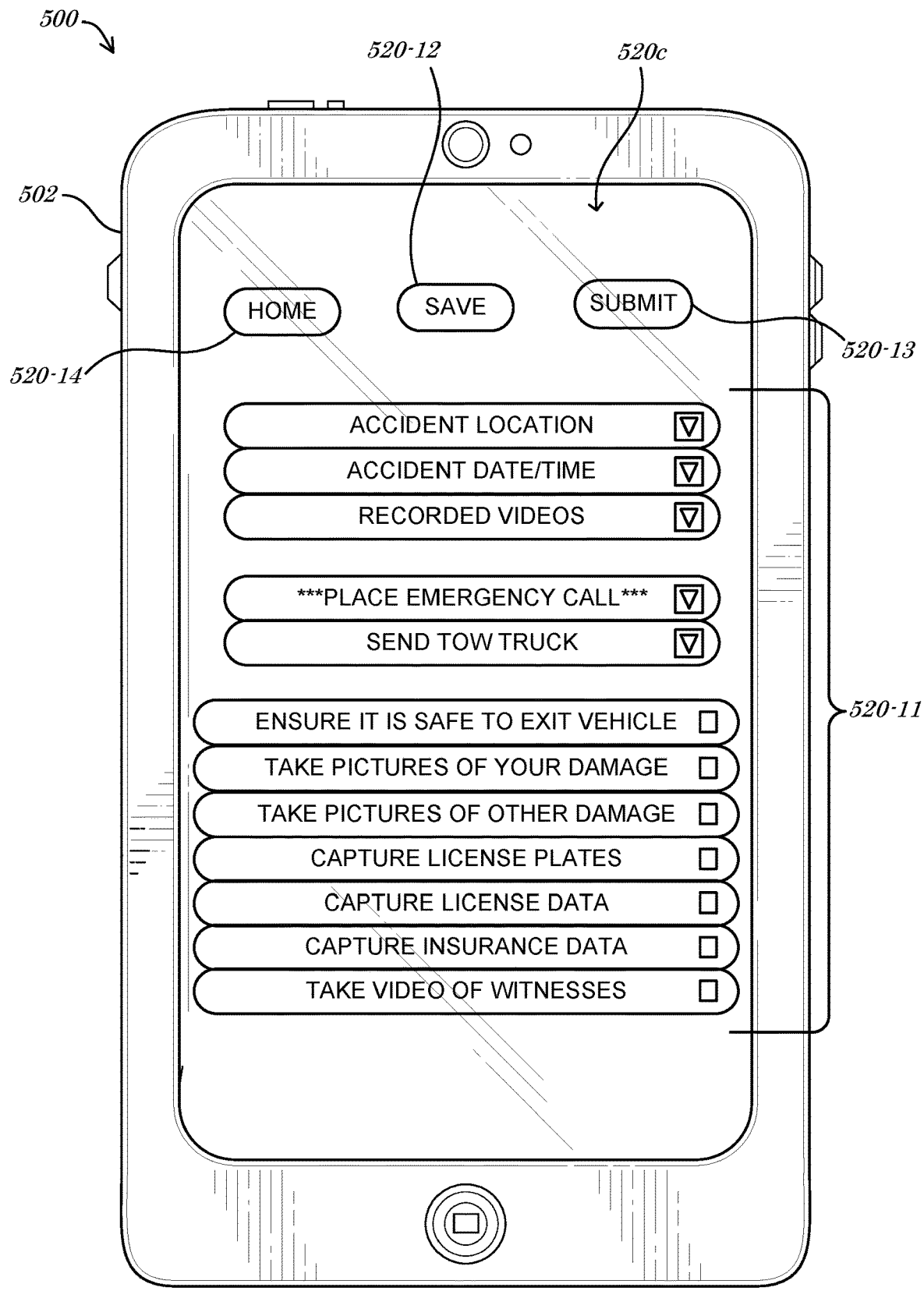

Turning now to FIG. 5A, FIG. 5B, and FIG. 5C, diagrams of a system 500 depicting a user device 502 providing instances of an example interface 520a-c according to some embodiments are shown. In some embodiments, the interface 520a-c may comprise a web page, web form, database entry form, API, spreadsheet, table, and/or application or other GUI by which a user or other entity may enter data (e.g., provide or define input) to enable receipt and/or management of automatic accident detection, verification, and/or analysis information and/or trigger automatic accident detection, verification, and/or analysis functionality, as described herein. The interface 520a-c may, for example, comprise a front-end of an automatic accident detection, verification, and/or analysis program and/or platform programmed and/or otherwise configured to execute, conduct, and/or facilitate the systemic method 400 of FIG. 4 herein, and/or portions thereof. In some embodiments, the interface 520a-c may be output via a computerized device, such as the user device 502, which may for example, be similar in configuration to one or more of the user/mobile electronic devices 102a, 202a and/or the server 110, or the apparatus 610, of FIG. 1, FIG. 2, and/or FIG. 6 herein.

According to some embodiments, the interface 520a-c may comprise one or more tabs and/or other segmented and/or logically-presented data forms and/or fields. In some embodiments, the interface 520a-c may be configured and/or organized to allow and/or facilitate entry and/or acquisition of information regarding an accident event, scene, and/or device or object associated with such an event and/or scene. According to some embodiments, the interface 502a-c may comprise a menu page from which a user may select one or more options that initiate specific functionality of a mobile device application executed by the user device 502. As depicted in FIG. 5A, for example, a first version (or page or instance) of the interface 520a may comprise a "Menu" or "Home Page" interface (e.g., defining a first input and/or output mechanism) by providing an area (e.g., one or more data entry mechanisms, tools, objects, and/or features) that provides for selection/activation of (i) a "settings" button 520-1, (ii) a "raise claim" button 520-2, (iii) a "start recording" button 520-3, (iv) a "preferred auto" button 520-4, (v) an "accident history" button 520-5, (vi) a "policy details" button 520-6, (vii) a "view map" button 520-7, and/or (viii) a "call" button 520-8.

In some embodiments, the first version (or page or instance) of the interface 520a may be utilized to enable access to various accident detection/analysis information and/or functionality. The settings button 520-1 may, when actuated or selected by the user, for example, permit definition and/or editing of values that govern various settings and/or preferences, such as camera and/or sensor recording frequencies, resolutions, and/or loop settings, insurance policy information, vehicle information, contact information, and/or rules definitions. Rules definitions may comprise, for example, definitions for one or more rules that govern (i) accident detection (e.g., sensor threshold settings), (ii) accident verification (e.g., comparative sensor algorithms), and/or (iii) accident responses (e.g., types of accident and appropriate responses).

According to some embodiments, the raise claim button 520-2 may, when actuated or selected by the user, initiate a sub-routine that transmits a signal to an insurance company server (not shown) and provides accident notification, details, and/or evidence (e.g., camera images/video). In some embodiments, the raise claim button 520-2 may be generated and/or enabled upon automatic detection (e.g., based on upon sensor threshold settings) of an accident event and/or may be output as a prompt to request claim initiation by a user (not shown). According to some embodiments, the start recording button 520-3, when actuated or selected by the user, initiates a sub-routine that activates a recording of image, audio, video, and/or other electronic data feed from a sensor, such as a camera and/or camera array as described herein. In some embodiments, the sensor feed may be recorded from a sensor coupled to the user device 502 (not separately depicted) and/or from a sensor of a different device (not shown), such as a vehicle or other sensor within communication range of the user device 502. According to some embodiments, the start recording button 520-3 may activate an automatic sensor data capture routine, such as an auto-record feature that triggers recording automatically upon detection of an accident event.

In some embodiments, the preferred auto button 520-4 may, when actuated or selected by the user, for example, initiate a sub-routine that directs the user to information input and/or output areas (e.g., additional interface views) for preferred auto information. According to some embodiments, the accident history button 520-5 may, when actuated or selected by the user, for example, initiate a sub-routine that provides information detailing previous accident event, scene, reconstruction, claim submission results, and/or other accident-related data for the user (e.g., stored in association with an account of the user). In some embodiments, the policy details button 520-6 may, when actuated or selected by the user, for example, initiate a sub-routine that directs the user to information input and/or output areas (e.g., additional interface views) for insurance policy (e.g., personal, fleet, auto collision and/or liability insurance policy) information. In one embodiment, actuation or selection of the policy details button 520-6 may result in the generation and display of an electronic insurance identification card (not shown). According to some embodiments, the view map button 520-7 may, when actuated or selected by the user, for example, initiate a sub-routine that directs the user to a map view or interface screen (not shown) that provides location-based graphical depictions of any or all of (i) the user's current location (e.g., a location of the user device 502 and/or a vehicle of the user—not shown) and/or previous locations (e.g., course taken/travel path), (ii) an accident scene location, (iii) other user's and/or vehicle locations, and/or (iv) accident reconstruction information (e.g., distances between vehicles and/or objects, such as lanes, curbs, obstacles, and/or weather data). In some embodiments, the call button 520-8 may, when actuated or selected by the user, for example, initiate a sub-routine that triggers a communication (e.g., a cellular telephone call, an e-mail, text message, etc.) to one or more stored communication addresses (e.g., an insurance company representative telephone number, a family member's communication address, an emergency telephone number, a repair facility text address, etc.).

In some embodiments, the application may cause the first interface 520a to display other or additional user-selectable menu choices (not shown) including sensor selection and/or pairing options, device discovery options (e.g., signal searching, detection, and/or triangulation), and/or vehicle device controls. The user-selectable menu choices displayed by the application may be part of a library of user-selectable objects. In some embodiments, the library of user-selectable objects includes other user-selectable objects that are selectively included for display based on their determined relevance (e.g., based on pre-stored data associations) to the user, the user device 502, a vehicle, a sensor, an insurance policy, and/or an accident event and/or scene.

Referring to FIG. 5B, a second version (or page or instance) of the interface 520b may comprise an incident/accident detection interface (e.g., defining a second input and/or output mechanism) by providing an incident detection prompt 520-9 and/or a verification button 520-10. The second version (or page or instance) of the interface 520b may be utilized, for example, upon a detection of an incident and/or event that exceeds sensor thresholds defined via the settings button 520-1. One or more sensors of the user device 502 and/or one or more vehicles or other devices (not shown) may, for example, provide sensor data that is analyzed by the application executed by the user device 502 with such analysis triggering the incident detection prompt 520-9. In some embodiments, the incident detection prompt 520-9 may request confirmation from the user regarding whether or not a detected incident is an accident (or not). The incident detection prompt 520-9 may comprise, for example, response/input options, such as the depicted "yes" and "no" options that a user may activate to provide feedback regarding the detected incident. In some embodiments, such as in the case that the user does not select one of the options within a predetermined amount of time (e.g., one minute), the incident may automatically be assumed to be an accident along with an assumption that the user is in need of help and/or incapacitated. The time-out threshold and/or default actions to be taken in the case no response is received may, in some embodiments, be defined via the settings button 520-1.

According to some embodiments, the verification button 520-10 of the second version of the interface 520b may, for example, upon a triggering and/or receipt of input from the user (e.g., a properly-positioned click of a mouse or other pointer) with respect to the verification button 520-10, initiate a sub-routine that causes a querying of additional sensor data from one or more other sensors and/or devices. The additional information may be compared to the original sensor data that triggered the provision of the incident detection prompt 520-9, for example, to calculate a comparison of the data to verify whether an accident has likely occurred. In the case that the original sensor data comprised accelerometer data from an accelerometer (not shown) of the user device 502, for example, a vehicle in which the user device 502 is disposed (or in communication with) may be queried to determine if any of the vehicle's sensors corroborate the user device 502 sensor reading. In the case that the vehicle's sensors have not registered any data that falls outside predetermined thresholds, it may be assumed, for example, that the user device 502 was dropped, but that no vehicle accident has occurred. In some embodiments, such verification may be conducted automatically, without requiring activation of the verification button 520-10. The incident detection prompt 520-9 may only be output, in some embodiments, for example, in the case that at least two sensors from different electronic devices (e.g., the user device 502 and a vehicle) indicate a potential accident event.

In some embodiments, either a positive indication of an accident (e.g., a selection of the "yes" option of the incident detection prompt 520-9) or a lack of a response may trigger a call to and/or otherwise cause a provision, generation, and/or outputting of a third version of the interface 520c (and/or the third version of the interface 520c may be automatically provided upon event detection). In some embodiments, the third version (or page or instance) of the interface 520c may comprise an accident checklist 520-11 providing a plurality of sub-menus, drop-down lists, and/or other input/output features that assist a user in managing an appropriate response to the accident. In some embodiments, the sub-menus, prompts, directions, and/or information provided in the accident checklist 520-11 may be populated with different data depending upon values for certain variables, such as the type of accident, the location of the accident, a number of detected vehicles involved, insurance policy coverages, limits, riders, and/or restrictions, user account information, etc. The "Send Tow Truck?" option may, for example, be linked to specific contact information for repair and/or tow facilities that are proximate to a detected location of the accident (e.g., a location of the user device 502 at the time of detection).

According to some embodiments, the third version of the interface 520c may comprise a save button 520-12, a submit button 520-13, and/or a home button 520-14. The save button 520-12 may, when actuated or selected by the user, for example, initiate a sub-routine that stores any or all accident and/or incident data entered by the user (e.g., in response to and/or utilizing the accident checklist 520-11 input features and/or prompts) and/or automatically captured (e.g., from one or more sensors). In such a manner, for example, a user may begin an accident report and/or claims process and save entered information for later completion of the accident checklist 520-11 and/or claim submission. In some embodiments, the submit button 520-13 may, when actuated or selected by the user, for example, initiate a sub-routine that transmits any or all saved, input, and/or captured data (e.g., text details of a user's description of the accident, automatically captured video/images of the accident scene, optically-recognized character information from image data, etc.) to a remote server (not shown; e.g., the server 110 of FIG. 1 herein). The submit button 520-13 may, for example, trigger an initiation of a claims process with an insurance carrier by uploading data values and/or fields into one or more insurance carrier databases, forms, and/or data storage columns and/or features. According to some embodiments, the home button 520-14 may, when actuated or selected by the user, for example, trigger a call to and/or otherwise cause a provision, generation, and/or outputting of the first version of the interface 520*a* (e.g., the "home" screen).

While various components of the interface 520*a-c* have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

V. Automated Accident Analysis Apparatus and Articles of Manufacture

Figure 6:
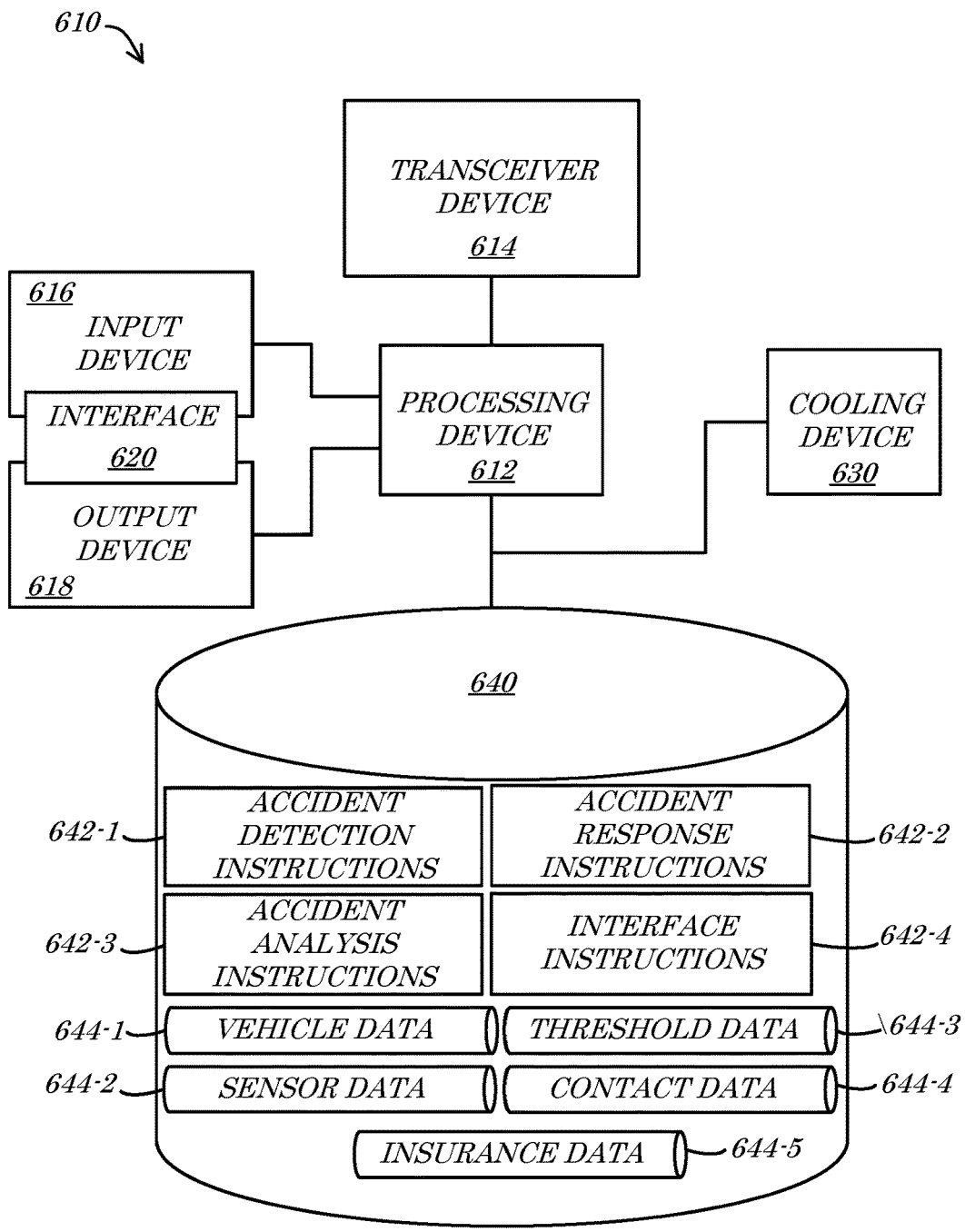
FIG. 6 is a block diagram of an apparatus according to some embodiments.
Figure 7A:
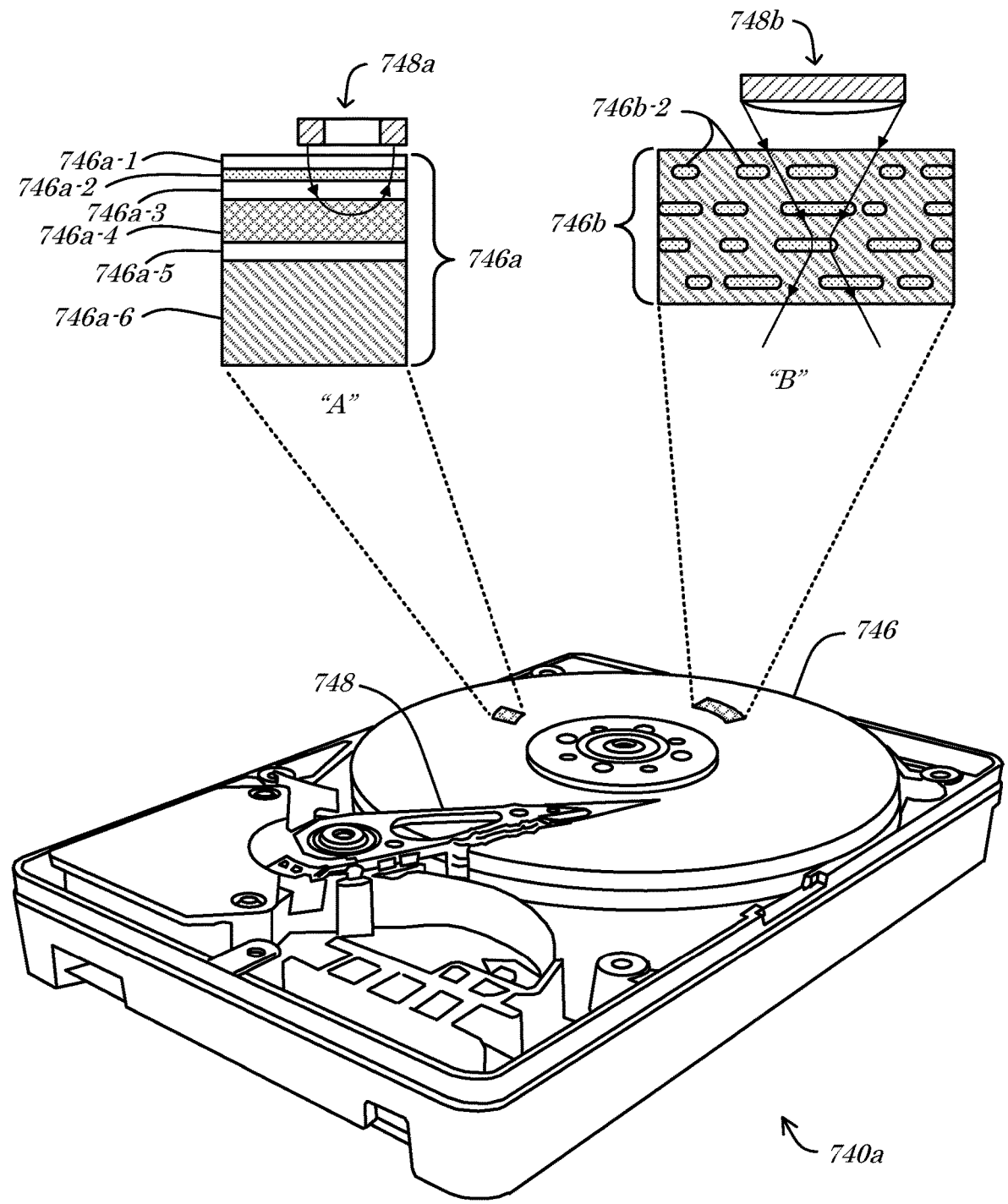
FIG. 7A, FIG. 7B, FIG. 7C, FIG. 7D, and FIG. 7E are perspective diagrams of exemplary data storage devices according to some embodiments.
Figure 7B:
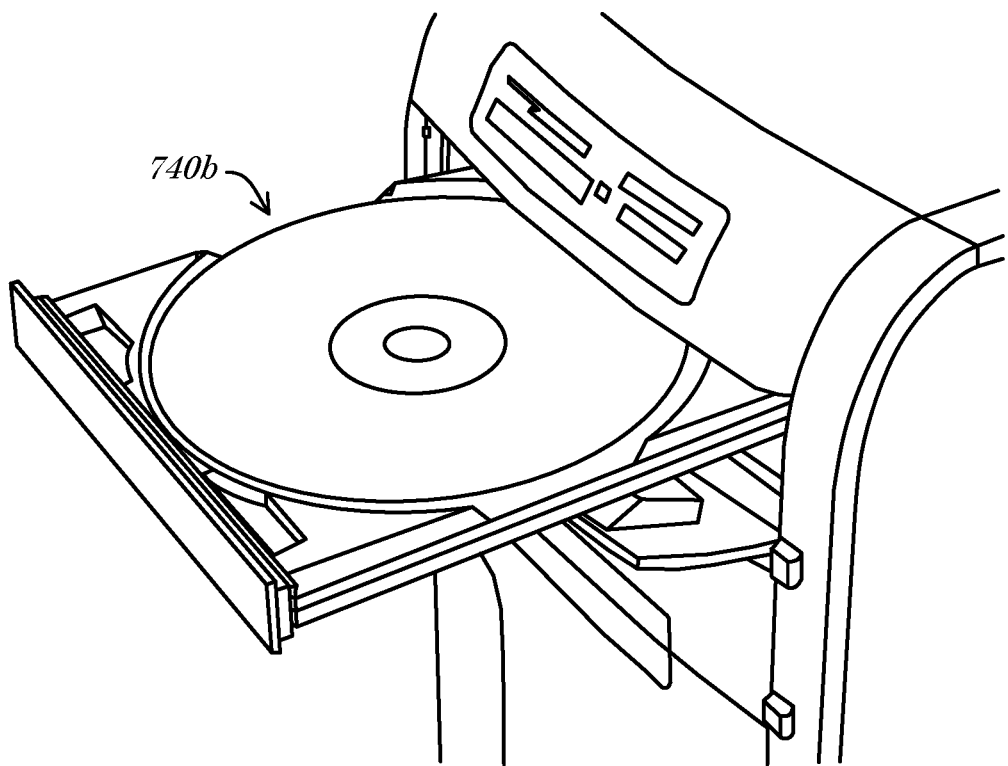
Figure 7C:
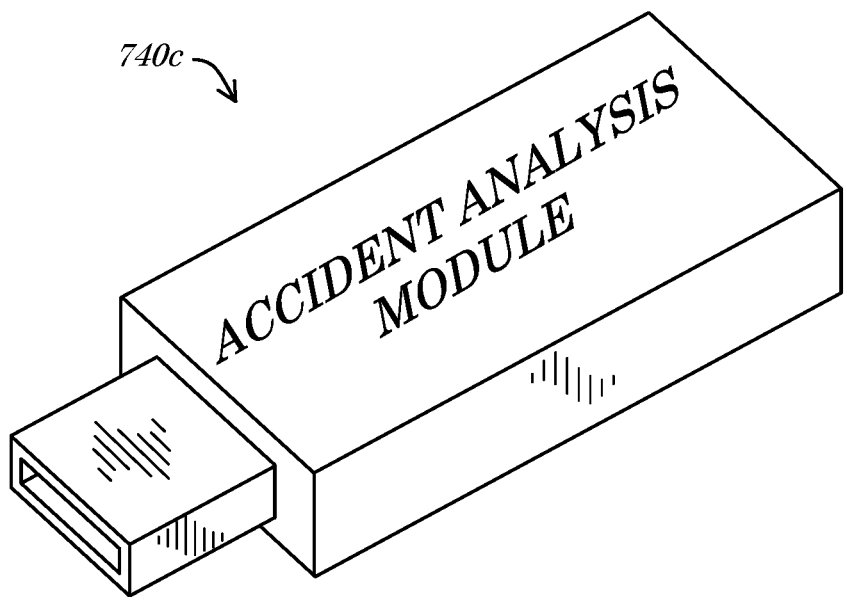
Figure 7D:
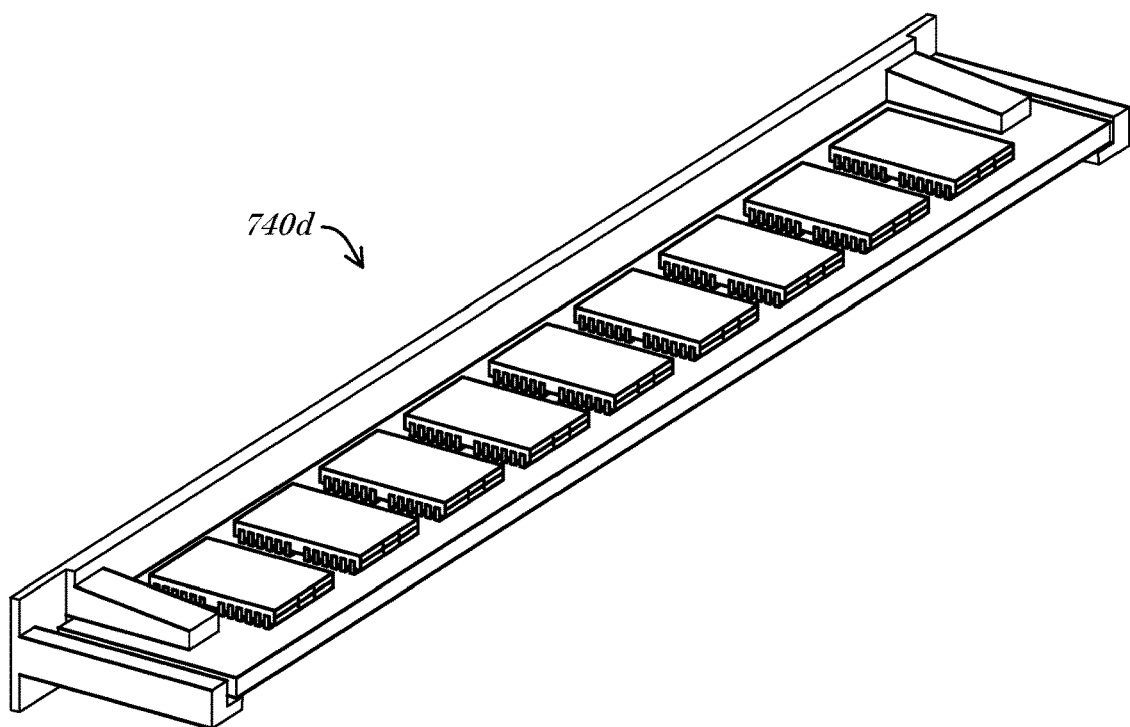
Figure 7E:
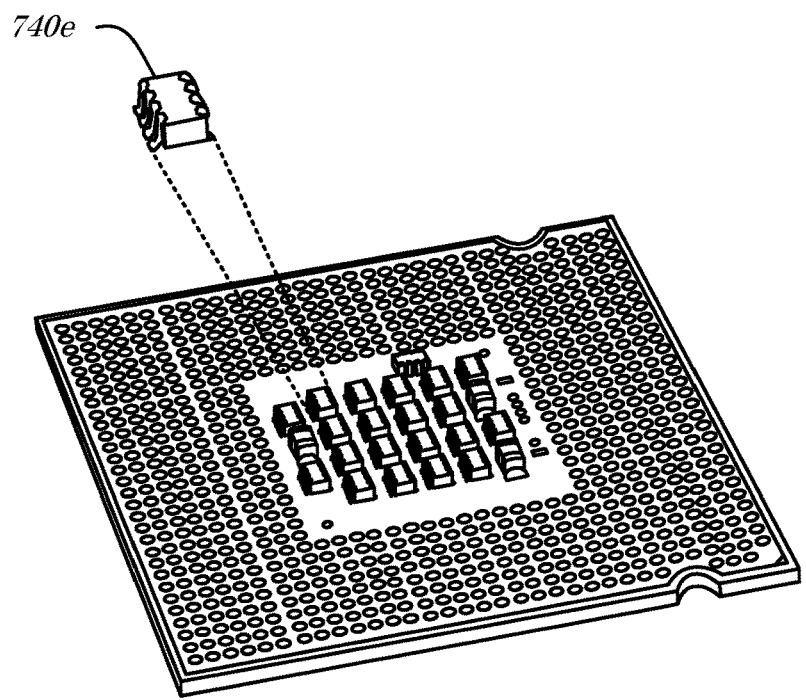

Turning to FIG. 6, a block diagram of an apparatus 610 according to some embodiments is shown. In some embodiments, the apparatus 610 may be similar in configuration and/or functionality to any of the server 110, the third-party device 106, and/or the user/mobile electronic devices 102*a*, 202*a*, 502 of FIG. 1, FIG. 2, and/or FIG. 5 herein. The apparatus 610 may, for example, execute, process, facilitate, and/or otherwise be associated with the method 400 of FIG. 4 herein, and/or portions thereof. In some embodiments, the apparatus 610 may comprise a processing device 612, a transceiver device 614, an input device 616, an output device 618, an interface 620, a memory device 640 (storing various programs and/or instructions 642 and data 644), and/or a cooling device 650. According to some embodiments, any or all of the components 612, 614, 616, 618, 620, 640, 642, 644, 650 of the apparatus 610 may be similar in configuration and/or functionality to any similarly named and/or numbered components described herein. Fewer or more components 612, 614, 616, 618, 620, 640, 642, 644, 650 and/or various configurations of the components 612, 614, 616, 618, 620, 640, 642, 644, 650 be included in the apparatus 610 without deviating from the scope of embodiments described herein.

According to some embodiments, the processor 612 may be or include any type, quantity, and/or configuration of processor that is or becomes known. The processor 612 may comprise, for example, an Intel® IXP 2800 network processor or an Intel® XEON™ Processor coupled with an Intel® E7501 chipset. In some embodiments, the processor 612 may comprise multiple inter-connected processors, microprocessors, and/or micro-engines. According to some embodiments, the processor 612 (and/or the apparatus 610 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 610 comprises a server such as a blade server, necessary power may be supplied via a standard AC outlet, power strip, surge protector, and/or Uninterruptible Power Supply (UPS) device.

In some embodiments, the transceiver device 614 may comprise any type or configuration of communication device that is or becomes known or practicable. The transceiver device 614 may, for example, comprise a Network Interface Card (NIC), a telephonic device, a cellular network device, a router, a hub, a modem, and/or a communications port or cable. In some embodiments, the transceiver device 614 may be coupled to receive sensor data from one or more sensors (not separately depicted), such as in the case that the apparatus 610 is utilized to automatically capture accident scene video/images and/or other data. The transceiver device 614 may, for example, comprise a BLE and/or RF receiver device that acquires broadcast and/or transmitted sensor data and/or a transmitter device that provides such data to a remote server (not shown). According to some embodiments, the transceiver device 614 may also or alternatively be coupled to the processor 612. In some embodiments, the transceiver device 614 may comprise an IR, RF, Bluetooth™, Near-Field Communication (NFC), and/or Wi-Fi® network device coupled to facilitate communications between the processor 612 and another device (such as a vehicle and/or remote server, not shown in FIG. 6).

In some embodiments, the input device 616 and/or the output device 618 are communicatively coupled to the processor 612 (e.g., via wired and/or wireless connections and/or pathways) and they may generally comprise any types or configurations of input and output components and/or devices that are or become known, respectively. The input device 616 may comprise, for example, a keyboard that allows an operator of the apparatus 610 to interface with the apparatus 610 (e.g., by an insurance customer and/or accident victim or witness). In some embodiments, the input device 616 may comprise a sensor such as a receiver, a camera, a proximity sensor, a vehicle device status sensor, a signal strength meter, etc. The output device 618 may, according to some embodiments, comprise a display screen and/or other practicable output component and/or device. The output device 618 may, for example, provide the interface 620 (such as the interfaces 220, 320, 520*a-c* of FIG. 2, FIG. 3, FIG. 5A, FIG. 5B, and/or FIG. 5C herein) via which automatic accident detection, verification, and/or analysis functionality are provided to a user (e.g., via a website and/or mobile application). According to some embodiments, the input device 616 and/or the output device 618 may comprise and/or be embodied in a single device such as a touch-screen monitor.

The memory device 640 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of accident detection instructions 642-1, accident response instructions 642-2, accident analysis instructions 642-3, interface instructions 642-4, vehicle data 644-1, sensor data 644-2, threshold data 644-3, contact data 644-4, and/or insurance data 644-5. In some embodiments, the accident detection instructions 642-1, accident response instructions 642-2, accident analysis instructions 642-3, interface instructions 642-4 may be utilized by the processor 612 to provide output information via the output device 618 and/or the transceiver device 614.

According to some embodiments, the accident detection instructions 642-1 may be operable to cause the processor 612 to process the vehicle data 644-1, sensor data 644-2, threshold data 644-3, contact data 644-4, and/or insurance data 644-5 in accordance with embodiments as described herein. Vehicle data 644-1, sensor data 644-2, threshold data 644-3, contact data 644-4, and/or insurance data 644-5 received via the input device 616 and/or the transceiver device 614 may, for example, be analyzed, sorted, filtered, decoded, decompressed, ranked, scored, plotted, and/or otherwise processed by the processor 612 in accordance with the accident detection instructions 642-1. In some embodiments, vehicle data 644-1, sensor data 644-2, threshold data 644-3, contact data 644-4, and/or insurance data 644-5 may be fed by the processor 612 through one or more mathematical and/or statistical formulas and/or models in accordance with the accident detection instructions 642-1 to detect out-of-threshold sensor data events and/or verify potential accident occurrences by comparing data from multiple sensors (and/or from multiple devices—e.g., a mobile electronic device and an associated vehicle).

In some embodiments, the accident response instructions 642-2 may be operable to cause the processor 612 to process the vehicle data 644-1, sensor data 644-2, threshold data 644-3, contact data 644-4, and/or insurance data 644-5 in accordance with embodiments as described herein. Vehicle data 644-1, sensor data 644-2, threshold data 644-3, contact data 644-4, and/or insurance data 644-5 received via the input device 616 and/or the transceiver device 614 may, for example, be analyzed, sorted, filtered, decoded, decompressed, ranked, scored, plotted, and/or otherwise processed by the processor 612 in accordance with the accident response instructions 642-2. In some embodiments, vehicle data 644-1, sensor data 644-2, threshold data 644-3, contact data 644-4, and/or insurance data 644-5 may be fed by the processor 612 through one or more mathematical and/or statistical formulas and/or models in accordance with the accident response instructions 642-2 to identify a type of accident and/or event, identify (e.g., query/lookup) an assigned response action for the type of accident/event, and/or initiate and/or execute the assigned response action (e.g., initiating a telephone call to a particular pre-stored telephone number, automatically unlocking vehicle doors or disabling electric cabling, etc.), as described herein.

According to some embodiments, the accident analysis instructions 642-3 may be operable to cause the processor 612 to process the vehicle data 644-1, sensor data 644-2, threshold data 644-3, contact data 644-4, and/or insurance data 644-5 in accordance with embodiments as described herein. Vehicle data 644-1, sensor data 644-2, threshold data 644-3, contact data 644-4, and/or insurance data 644-5 received via the input device 616 and/or the transceiver device 614 may, for example, be analyzed, sorted, filtered, decoded, decompressed, ranked, scored, plotted, and/or otherwise processed by the processor 612 in accordance with the accident analysis instructions 642-3. In some embodiments, vehicle data 644-1, sensor data 644-2, threshold data 644-3, contact data 644-4, and/or insurance data 644-5 may be fed by the processor 612 through one or more mathematical and/or statistical formulas and/or models in accordance with the accident analysis instructions 642-3 to calculate a likelihood of accident causation and/or assignment of responsibility, calculate an estimated amount of damage, and/or calculate an amount payable in response to an insurance claim submission, as described herein.

In some embodiments, the interface instructions 642-4 may be operable to cause the processor 612 to process the vehicle data 644-1, sensor data 644-2, threshold data 644-3, contact data 644-4, and/or insurance data 644-5 in accordance with embodiments as described herein. Vehicle data 644-1, sensor data 644-2, threshold data 644-3, contact data 644-4, and/or insurance data 644-5 received via the input device 616 and/or the transceiver device 614 may, for example, be analyzed, sorted, filtered, decoded, decompressed, ranked, scored, plotted, and/or otherwise processed by the processor 612 in accordance with the interface instructions 642-4. In some embodiments, vehicle data 644-1, sensor data 644-2, threshold data 644-3, contact data 644-4, and/or insurance data 644-5 may be fed by the processor 612 through one or more mathematical and/or statistical formulas and/or models in accordance with the interface instructions 642-4 to provide the interface 620 (e.g., such as the interface 220, 320, 520*a-e* of FIG. 2, FIG. 3, FIG. 5A, FIG. 5B, and/or FIG. 5C herein) via which input and/or output descriptive of an accident event, scene, response action, and/or result may be captured and/or provided, as described herein.

According to some embodiments, the apparatus 610 may comprise the cooling device 650. According to some embodiments, the cooling device 650 may be coupled (physically, thermally, and/or electrically) to the processor 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 610.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated).

Referring to FIG. 7A, FIG. 7B, FIG. 7C, FIG. 7D, and FIG. 7E, perspective diagrams of exemplary data storage devices 740*a-e* according to some embodiments are shown. The data storage devices 740*a-e* may, for example, be utilized to store instructions and/or data such as the accident detection instructions 642-1, accident response instructions 642-2, accident analysis instructions 642-3, interface instructions 642-4, vehicle data 644-1, sensor data 644-2, threshold data 644-3, contact data 644-4, and/or insurance data 644-5, each of which is presented in reference to FIG. 6 herein. In some embodiments, instructions stored on the data storage devices 740*a-e* may, when executed by a processor, cause the implementation of and/or facilitate the method 400 of FIG. 4 herein, and/or portions thereof.

According to some embodiments, the first data storage device 740*a* may comprise one or more various types of internal and/or external hard drives. The first data storage device 740*a* may, for example, comprise a data storage medium 746 that is read, interrogated, and/or otherwise communicatively coupled to and/or via a disk reading device 748. In some embodiments, the first data storage device 740*a* and/or the data storage medium 746 may be configured to store information utilizing one or more magnetic, inductive, and/or optical means (e.g., magnetic, inductive, and/or optical-encoding). The data storage medium 746, depicted as a first data storage medium 746*a* for example (e.g., breakout cross-section "A"), may comprise one or more of a polymer layer 746*a*-1, a magnetic data storage layer 746*a*-2, a non-magnetic layer 746*a*-3, a magnetic base layer 746*a*-4, a contact layer 746*a*-5, and/or a substrate layer 746*a*-6. According to some embodiments, a magnetic read head 748a may be coupled and/or disposed to read data from the magnetic data storage layer 746a-2.

In some embodiments, the data storage medium 746, depicted as a second data storage medium 746b for example (e.g., breakout cross-section "B"), may comprise a plurality of data points 746b-2 disposed with the second data storage medium 746b. The data points 746b-2 may, in some embodiments, be read and/or otherwise interfaced with via a laser-enabled read head 748b disposed and/or coupled to direct a laser beam through the second data storage medium 746b.

In some embodiments, the second data storage device 740b may comprise a CD, CD-ROM, DVD, Blu-Ray™ Disc, and/or other type of optically-encoded disk and/or other storage medium that is or becomes know or practicable. In some embodiments, the third data storage device 740c may comprise a USB keyfob, dongle, and/or other type of flash memory data storage device that is or becomes know or practicable. In some embodiments, the fourth data storage device 740d may comprise RAM of any type, quantity, and/or configuration that is or becomes practicable and/or desirable. In some embodiments, the fourth data storage device 740d may comprise an off-chip cache such as a Level 2 (L2) cache memory device. According to some embodiments, the fifth data storage device 740e may comprise an on-chip memory device such as a Level 1 (L1) cache memory device.

The data storage devices 740a-e may generally store program instructions, code, and/or modules that, when executed by a processing device cause a particular machine to function in accordance with one or more embodiments described herein. The data storage devices 740a-e depicted in FIG. 7A, FIG. 7B, FIG. 7C, FIG. 7D, and FIG. 7E are representative of a class and/or subset of computer-readable media that are defined herein as "computer-readable memory" (e.g., non-transitory memory devices as opposed to transmission devices or media).

VI. Terms and Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a PDA, a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™ TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

VII. Conclusion

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A method for automatic accident analysis, comprising:
receiving, via a wireless transceiver device in communication with an electronic processing device, first input indicative of an accident event;
identifying, by the electronic processing device and based on an application of the accident identification rules to the received first input, that an accident has occurred;
initiating, by the electronic processing device and based on an application of the accident response rules, an accident response plan;
capturing, automatically and based on an application of the accident analysis rules, sensor data associated with at least one electronic device involved in the accident, wherein the capturing of the sensor data associated with the at least one electronic device involved in the accident comprises capturing information descriptive of an execution state of a mobile device application with respect to a first time proximate to a time of the accident, wherein the information descriptive of the execution state of the mobile device application comprises an indication that, at the first time, the mobile device application (i) was paused or (ii) was suspended or (iii) was exited;
generating, by the electronic processing device and based on the captured sensor data and the accident analysis rules, a virtual accident scene;
calculating, by the electronic processing device and based on the virtual accident scene and the accident analysis rules, an accident result; and
transmitting, via the wireless transceiver device and to a remote electronic device, an indication of the calculated accident result.

2. The method of claim 1, wherein the receiving of the first input indicative of the accident event comprises receiving, via the wireless transceiver device and from a short-range wireless transmitter device of a vehicle, an indication of a value output by a sensor of the vehicle.

3. The method of claim 2, wherein the sensor of the vehicle comprises one or more of an airbag deployment sensor, an anti-lock braking sensor, an accelerometer sensor, and tire pressure sensor.

4. The method of claim 1, wherein the receiving of the first input indicative of the accident event comprises receiving data from an accelerometer in communication with the electronic processing device.

5. The method of claim 1, wherein the identifying that the accident has occurred comprises:
identifying a numeric threshold defined by the accident identification rules; and
identifying, based on a comparison of a value defined by the first input with the numeric threshold, that the value defined by the first input exceeds the numeric threshold.

6. The method of claim 1, wherein the initiating of the accident response plan comprises:
identifying, based on the first input, a type of the accident;
selecting, by conducting a query based on the accident response rules, the accident response plan from a plurality of pre-stored accident response plans, the accident response plan defining at least one accident response action; and
initiating the at least one accident response action.

7. The method of claim 6, wherein the accident response action comprises initiating an emergency telephone call to a pre-stored telephone number.

8. The method of claim 6, wherein the accident response action comprises initiating at least one of (i) an emergency text message to a pre-stored mobile phone number and (ii) an emergency e-mail to a pre-stored e-mail account.

9. The method of claim 1, wherein the capturing of the sensor data associated with the at least one electronic device involved in the accident, further comprises:
querying a video capture device of a vehicle involved in the accident; and
downloading stored video data descriptive of a location of the accident.

10. The method of claim 9, wherein the video capture device comprises a data storage device storing at least one of video, audio, and image data received from an array of cameras coupled to the vehicle involved in the accident.

11. The method of claim 1, wherein the capturing of the sensor data associated with the at least one electronic device involved in the accident, further comprises:
activating a video capture device in communication with the electronic processing device.

12. The method of claim 1, wherein the capturing of the sensor data associated with the at least one electronic device involved in the accident further comprises capturing at least one of image data and video data of the accident location and further comprising:
identifying, from the at least one of the image data and the video data, text information; and
converting, utilizing optical character recognition, the text information into digital character data.

13. The method of claim 12, wherein the at least one of the image data and video data comprises at least one of an image and video of a vehicle identifier and wherein the converted digital character data comprises at least one of a license plate number, a make and model of the vehicle, a Vehicle Identification Number (VIN), and vehicle registration number.

14. The method of claim 12, wherein the at least one of the image data and video data comprises at least one of an image and video of a vehicle operator's license, and wherein the converted digital character data comprises at least one of an operator license number, a mailing address, a vehicle operator's name, a license type, a license date value, and a license issuing state.

15. The method of claim 12, wherein the at least one of the image data and video data comprises at least one of an image and video of an insurance card, and wherein the converted digital character data comprises at least one of an insurance policy number, an insurance provider, and an insurance provider contact telephone number.

16. The method of claim 12, wherein the at least one of the image data and video data comprises at least one of an image and video of a road sign, and wherein the converted digital character data comprises at least one of a road name, a mile marker number, a utility pole identifier, a route number, an exit number, and a traffic command.

17. The method of claim 1, wherein the generating of the virtual accident scene, comprises:
   generating a graphical representation of the location of the accident; and
   plotting location information from the captured sensor data on the graphical representation of the location of the accident.

18. The method of claim 1, wherein the calculating of the accident result, comprises:
   computing, based on mathematical analysis of the virtual accident scene, an estimated extent of damage incurred during the accident; and
   computing, based on the estimated extent of damage incurred, an estimated cost of repair.

19. The method of claim 18, wherein the calculating of the accident result, further comprises:
   computing, based on the estimated cost of repair and stored information descriptive of an insurance policy, an estimated claim coverage amount.

20. The method of claim 1, wherein the calculating of the accident result, comprises:
   computing, based on mathematical analysis of the virtual accident scene, a likelihood of a particular vehicle operator being at fault.

21. A method for automatic accident analysis, comprising:
   receiving, via a wireless transceiver device in communication with an electronic processing device, first input indicative of an accident event;
   identifying, by the electronic processing device and based on an application of the accident identification rules to the received first input, that an accident has occurred;
   initiating, by the electronic processing device and based on an application of the accident response rules, an accident response plan;
   capturing, automatically and based on an application of the accident analysis rules, sensor data associated with at least one electronic device involved in the accident, wherein the capturing comprises:
      detecting an electronic signal transmitted by the at least one electronic device involved in the accident;
      identifying, by decoding the electronic signal, the at least one electronic device involved in the accident;
      identifying a first location of the detecting and measuring a first signal strength of the electronic signal, at a first time;
      measuring a second signal strength of the electronic signal and identifying a second location of the measuring of the second signal strength, at a second time; and
      calculating, based on a signal triangulation algorithm, an estimated location of the at least one electronic device involved in the accident;
   generating, by the electronic processing device and based on the captured sensor data and the accident analysis rules, a virtual accident scene;
   calculating, by the electronic processing device and based on the virtual accident scene and the accident analysis rules, an accident result; and
   transmitting, via the wireless transceiver device and to a remote electronic device, an indication of the calculated accident result.

22. The method of claim 21, wherein the receiving of the first input indicative of the accident event comprises receiving, via the wireless transceiver device and from a short-range wireless transmitter device of a vehicle, an indication of a value output by a sensor of the vehicle.

23. The method of claim 22, wherein the sensor of the vehicle comprises one or more of an airbag deployment sensor, an anti-lock braking sensor, an accelerometer sensor, and tire pressure sensor.

24. The method of claim 21, wherein the receiving of the first input indicative of the accident event comprises receiving data from an accelerometer in communication with the electronic processing device.

25. The method of claim 21, wherein the identifying that the accident has occurred comprises:
   identifying a numeric threshold defined by the accident identification rules; and
   identifying, based on a comparison of a value defined by the first input with the numeric threshold, that the value defined by the first input exceeds the numeric threshold.

26. The method of claim 21, wherein the initiating of the accident response plan comprises:
   identifying, based on the first input, a type of the accident;
   selecting, by conducting a query based on the accident response rules, the accident response plan from a plurality of pre-stored accident response plans, the accident response plan defining at least one accident response action; and
   initiating the at least one accident response action;
      wherein the accident response action comprises initiating at least one of:
         (i) an emergency telephone call to a pre-stored telephone number;
         (ii) an emergency text message to a pre-stored mobile phone number; and
         (iii) an emergency e-mail to a pre-stored e-mail account.

27. The method of claim 21, wherein the capturing of the sensor data associated with the at least one electronic device involved in the accident, further comprises:
   querying a video capture device of a vehicle involved in the accident; and
   downloading stored video data descriptive of a location of the accident;
      and wherein the video capture device comprises a data storage device storing at least one of video, audio, and image data received from an array of cameras coupled to the vehicle involved in the accident.

28. The method of claim 21, wherein the capturing of the sensor data associated with the at least one electronic device involved in the accident, further comprises:
   activating a video capture device in communication with the electronic processing device.

29. The method of claim 21, wherein the capturing of the sensor data associated with the at least one electronic device involved in the accident further comprises capturing at least one of image data and video data of the accident location and further comprising:
   identifying, from the at least one of the image data and the video data, text information; and
   converting, utilizing optical character recognition, the text information into digital character data.

30. The method of claim 29, wherein the at least one of the image data and video data comprises at least one of an image and video of a vehicle identifier and wherein the converted digital character data comprises at least one of a license plate number, a make and model of the vehicle, a Vehicle Identification Number (VIN), and vehicle registration number.

31. The method of claim 29, wherein the at least one of the image data and video data comprises at least one of an image and video of a vehicle operator's license, and wherein the converted digital character data comprises at least one of an operator license number, a mailing address, a vehicle operator's name, a license type, a license date value, and a license issuing state.

32. The method of claim 29, wherein the at least one of the image data and video data comprises at least one of an image and video of an insurance card, and wherein the converted digital character data comprises at least one of an insurance policy number, an insurance provider, and an insurance provider contact telephone number.

33. The method of claim 29, wherein the at least one of the image data and video data comprises at least one of an image and video of a road sign, and wherein the converted digital character data comprises at least one of a road name, a mile marker number, a utility pole identifier, a route number, an exit number, and a traffic command.

34. The method of claim 21, wherein the generating of the virtual accident scene, comprises:
   generating a graphical representation of the location of the accident; and
   plotting location information from the captured sensor data on the graphical representation of the location of the accident.

35. The method of claim 21, wherein the calculating of the accident result, comprises;
   computing, based on mathematical analysis of the virtual accident scene, an estimated extent of damage incurred during the accident;
   computing, based on the estimated extent of damage incurred, an estimated cost of repair; and
   computing, based on the estimated cost of repair and stored information descriptive of an insurance policy, an estimated claim coverage amount.

36. The method of claim 21, wherein the calculating of the accident result, comprises:
   computing, based on mathematical analysis of the virtual accident scene, a likelihood of a particular vehicle operator being at fault.

* * * * *